United States Patent
Bernelas et al.

(10) Patent No.: US 11,694,091 B2
(45) Date of Patent: Jul. 4, 2023

(54) CREATION OF SCOPE DEFINITIONS

(71) Applicant: INTERNATIONAL BUSINESS MACHINES CORPORATION, Armonk, NY (US)

(72) Inventors: Jean-Michel G. B. Bernelas, Valbonne (FR); Ulrich M. Junker, Biot (FR); Thierry Kormann, Valbonne (FR); Guilhem J. Molines, Valbonne (FR)

(73) Assignee: International Business Machines Corporation, Armonk, NY (US)

( * ) Notice: Subject to any disclaimer, the term of this patent is extended or adjusted under 35 U.S.C. 154(b) by 1157 days.

(21) Appl. No.: 16/196,669

(22) Filed: Nov. 20, 2018

(65) Prior Publication Data
US 2020/0160192 A1 May 21, 2020

(51) Int. Cl.
*G06N 5/025* (2023.01)
*G06N 5/022* (2023.01)
*G06F 16/901* (2019.01)

(52) U.S. Cl.
CPC ......... *G06N 5/025* (2013.01); *G06F 16/9024* (2019.01); *G06N 5/022* (2013.01)

(58) Field of Classification Search
CPC ......... G06N 5/025; G06N 5/022; G06N 3/04; G06N 3/08; G06F 16/9024
See application file for complete search history.

(56) References Cited

U.S. PATENT DOCUMENTS

| | | | |
|---|---|---|---|
| 7,593,910 B1 | 9/2009 | Owen et al. | |
| 8,312,389 B2 | 11/2012 | Crawford et al. | |
| 9,135,574 B2 | 9/2015 | Matignon et al. | |
| 9,323,644 B1 * | 4/2016 | Hale | G06F 8/75 |
| 2015/0142726 A1 | 5/2015 | Taylor | |
| 2017/0308822 A1 | 10/2017 | Prismon et al. | |

OTHER PUBLICATIONS

Wang, S., Lo, D. & Jiang, L., "AutoQuery: automatic construction of dependency queries for code search", 2016, Autom Softw Eng 23, 393-425 (Year: 2016).*
Raychev, V., Vechev, M., Krause, A., "Predicting Program Properties from 'Big Code'", 2015. (Year: 2015).*

(Continued)

*Primary Examiner* — Kamran Afshar
*Assistant Examiner* — Brian J Hales
(74) *Attorney, Agent, or Firm* — Brandon L. Stephens; Jordan Schiller

(57) ABSTRACT

A method for receiving an ownership graph, wherein the ownership graph comprises a first set of nodes and a first set of directional edges, and wherein each of the first set of directional edges connects two nodes and indicates ownership of a first node by a second node, each node having at most one owner, the ownership graph being acyclic. The method further includes receiving a dependency graph that also comprises a set of nodes and a set of directional edges. The method further includes creating a respective enumerating variable declaration for each node in a path from an owner node to a root node in the ownership graph. The method further includes creating a respective accessing variable declaration for each owner node in the dependency graph of the current node.

15 Claims, 14 Drawing Sheets

(56) References Cited

OTHER PUBLICATIONS

Bishop et al., "Using Virtual Environments and Agent Models in Multi-Criteria Decision-Making," Land Use Policy, 2008, p. 87-94, vol. 26, Issue 1, Elsevier Ltd.

Buntine, "Operations for Learning with Graphical Models," Journal of Artificial Intelligence Research, 1994, p. 159-225, vol. 2, AI Access Foundation and Morgan Kaufmann Publishers.

Friedman et al., "Learning Probabilistic Relational Models," Proceedings of the Sixteenth International Joint Conference on Artificial Intelligence (IJCAI-99), Aug. 1999, 8 Pages, Stockholm, Sweden.

Taylor et al., "Real-World Decision Modeling with DMN," Effective Communication of Decision-Making, 2016, p. 1-30, Meghan-Kiffer Press, Free Preview.

\* cited by examiner

CREATION OF SCOPE DEFINITIONS

BACKGROUND

The present invention relates to a computer implemented method, a system and a computer program product for creating scope definitions comprised of enumerating variable declarations and accessing variable declarations.

SUMMARY

According to a first embodiment of the present invention, there is provided a computer implemented method comprising receiving an ownership graph comprising a plurality of nodes and directional edges, each edge connecting two nodes and indicating ownership of one node by the other node, each node having at most one owner the ownership graph being acyclic, receiving a dependency graph comprising a plurality of nodes and directional edges, each node in the dependency graph corresponding to a node in the ownership graph, each edge connecting two nodes and indicating dependency of the one node on the other node, the dependency graph being acyclic, for each node in the dependency graph with an incoming edge: creating a respective enumerating variable declaration for each node in the path from the owner node of the current node to a root node in the ownership graph, each enumerating variable declaration comprising a variable name, a variable type and a path expression specifying a variable range, and creating a respective accessing variable declaration for each parent node in the dependency graph of the current node, each accessing variable declaration comprising a variable name and a path expression specifying the values of the variable.

According to a second embodiment of the present invention, there is provided a system arranged to receive an ownership graph comprising a plurality of nodes and directional edges, each edge connecting two nodes and indicating ownership of one node by the other node, each node having at most one owner, the ownership graph being acyclic and a dependency graph comprising a plurality of nodes and directional edges, each node in the dependency graph corresponding to a node in the ownership graph, each edge connecting two nodes and indicating dependency of the one node on the other node, the dependency graph being acyclic, the system comprising an enumerator builder and an informational-scope builder, wherein, for each node in the dependency graph with an incoming edge, the enumerator builder is arranged to create a respective enumerating variable declaration for each node in the path from the owner node of the current node to a root node in the ownership graph, each enumerating variable declaration comprising a variable name, a variable type and a path expression specifying a variable range, and the informational-scope builder is arranged to create a respective accessing variable declaration for each parent, or owner, node in the dependency graph of the current node, each accessing variable declaration comprising a variable name and a path expression specifying the values of the variable.

According to a third embodiment of the present invention, there is provided a computer program product for controlling a system comprising a processor, the computer program product comprising a computer readable storage medium having program instructions embodied therewith, the program instructions are executable by the processor to cause the processor to receive an ownership graph comprising a plurality of nodes and directional edges, each edge connecting two nodes and indicating ownership of one node by the other node, each node having at most one owner, the ownership graph being acyclic, receive a dependency graph comprising a plurality of nodes and directional edges, each node in the dependency graph corresponding to a node in the ownership graph, each edge connecting two nodes and indicating dependency of the one node on the other node, the dependency graph being acyclic, for each node in the dependency graph with an incoming edge: create a respective enumerating variable declaration for each node in the path from the owner node of the current node to a root node in the ownership graph, each enumerating variable declaration comprising a variable name, a variable type and a path expression specifying a variable range, and create a respective accessing variable declaration for each parent, or owner, node in the dependency graph of the current node, each accessing variable declaration comprising a variable name and a path expression specifying the values of the variable.

DETAILED DESCRIPTION

Organizations such as government bodies, insurance companies, credit institutes, and sales organizations define decision policies in order to decide large volumes of cases in a consistent way. Such a decision policy may involve intermediate decisions. For example, a decision policy for determining the discounted price of an item may first decide the discount of the item and then compute the discounted price based on the list price and the discount. This example involves a single discounting decision and a single decision about the discounted price. The latter decision depends on the former.

However, the world is structured and usually involves multiple copies of the same pattern. For example, a customer may have a shopping cart containing multiple items. A decision policy for determining the total price of the shopping cart needs to compute the discounted price for each item in the shopping cart. Since each item in the shopping cart may have a particular discount, the decision policy needs to decide the particular discount for each item first, meaning the process for determining the discounted price of an item occurs multiple times. In an even more complex setting, a customer may have multiple shopping carts and the overall problem consists in computing the expenses of the customer based on the total price of each shopping cart. A decision policy for achieving this will involve the process for deciding the total price of a shopping cart multiple times.

Figure 1:
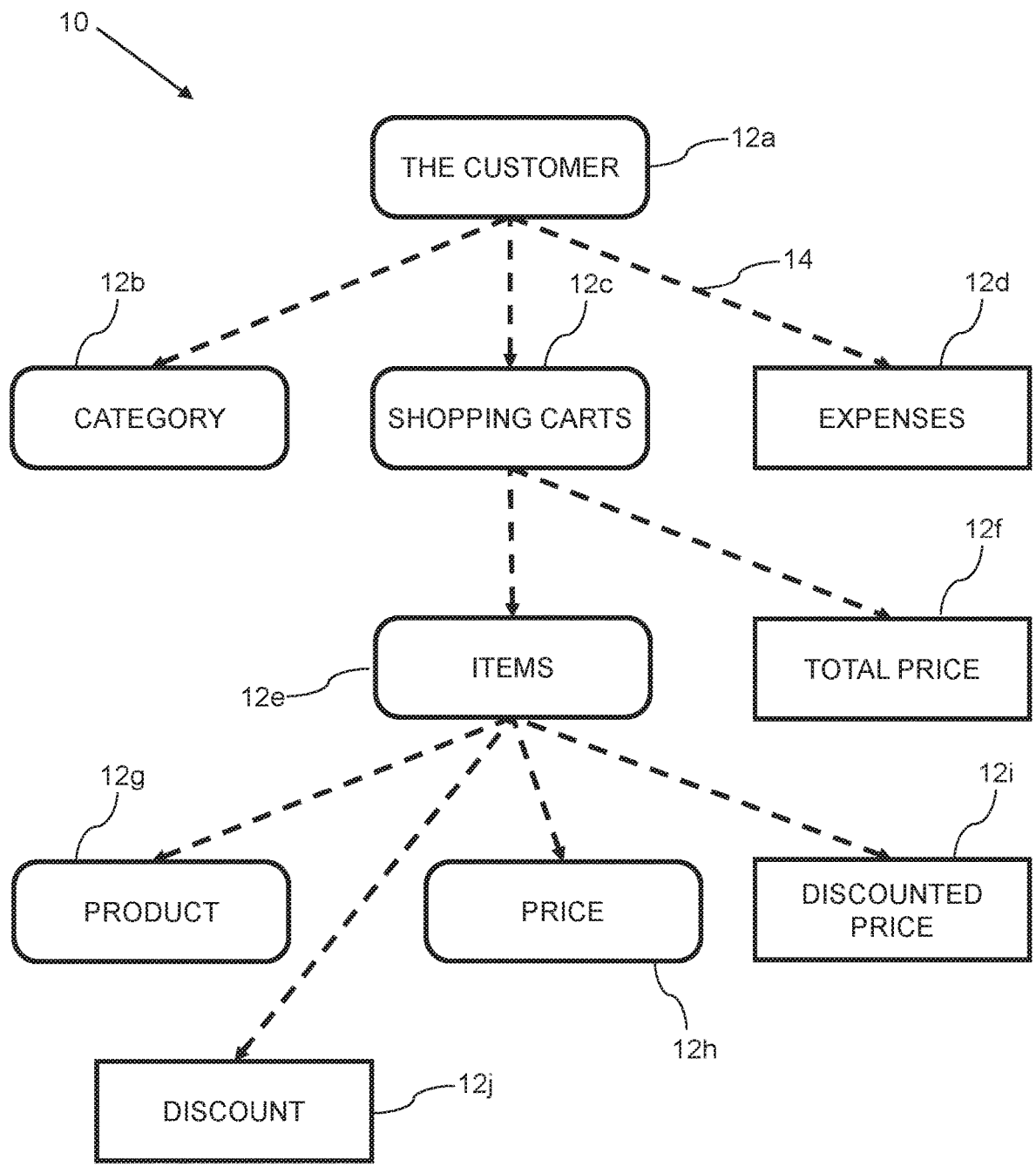
FIG. 1 is a schematic diagram of an ownership graph, in accordance with an exemplary embodiment of the present invention.

These examples show that the same kind of decision needs to be made for multiple objects, namely for all those objects that have a given ownership relation to a root object. For example, there needs to be a discount decision for all the items in all the shopping carts of a customer. Additionally, there needs to be a decision about the total price for all of the shopping carts of the customer. In this example, the customer is the owner of their shopping carts and each shopping cart is the owner of its items. These relations can be depicted by an ownership graph 10, as shown in FIG. 1. The ownership graph 10 includes a plurality of nodes 12a to 12j, referred to generally here as 12, and directional edges 14, each edge 14 connecting two nodes 12 and indicating ownership of one node 12 by the other node 12, each node 12 having at most one owner. The ownership graph 10 is acyclic. Each node 12 of the graph 10 can be referenced by a path expression which specifies a path (one or more edges 14) from a root object to a node 12 in this graph 10.

Such structured data can be stored in tabular form where columns represent different attributes and rows represent the cases. If an object such as a shopping cart owns other objects such as items, these items may be described by a nested table. Such data structures may then use indices of indices to refer to some attribute of an item of a shopping cart in some decision logic. An object-oriented representation of cases makes ownership relations explicit and permits the usage of path expressions instead of indices of indices. Nested tables may be transformed into an objected-oriented description and as the latter has advantages for all stakeholders of the decision policy, this is the advantageous representation of the cases.

In the ownership graph 10 of FIG. 1, certain nodes 12d, 12f, 12i and 12j are decision nodes, indicated by the square box used for these nodes 12. A decision node 12 is one that defines an attribute that has to be calculated rather than an attribute that is already determined. A leaf node 12 in the ownership graph 10 does not represent a single decision, but a family of similar decisions. For example, the node 12j for the discount decision represents multiple discount decisions as a customer may have multiple shopping carts, each of these shopping carts may contain multiple items, and each of these items requires a discount decision.

Different leaf nodes 12 in the ownership graph 10 represent different decision families. A decision in a family for one node 12 may depend on a decision in a family of another node 12 if those decisions are made for the same owner object. For example, the discounted price of an item will depend on the item's price and the item's discount. These dependencies may be represented by a dependency graph 16 that has the same nodes 12 as the ownership graph 10.

Figure 2:
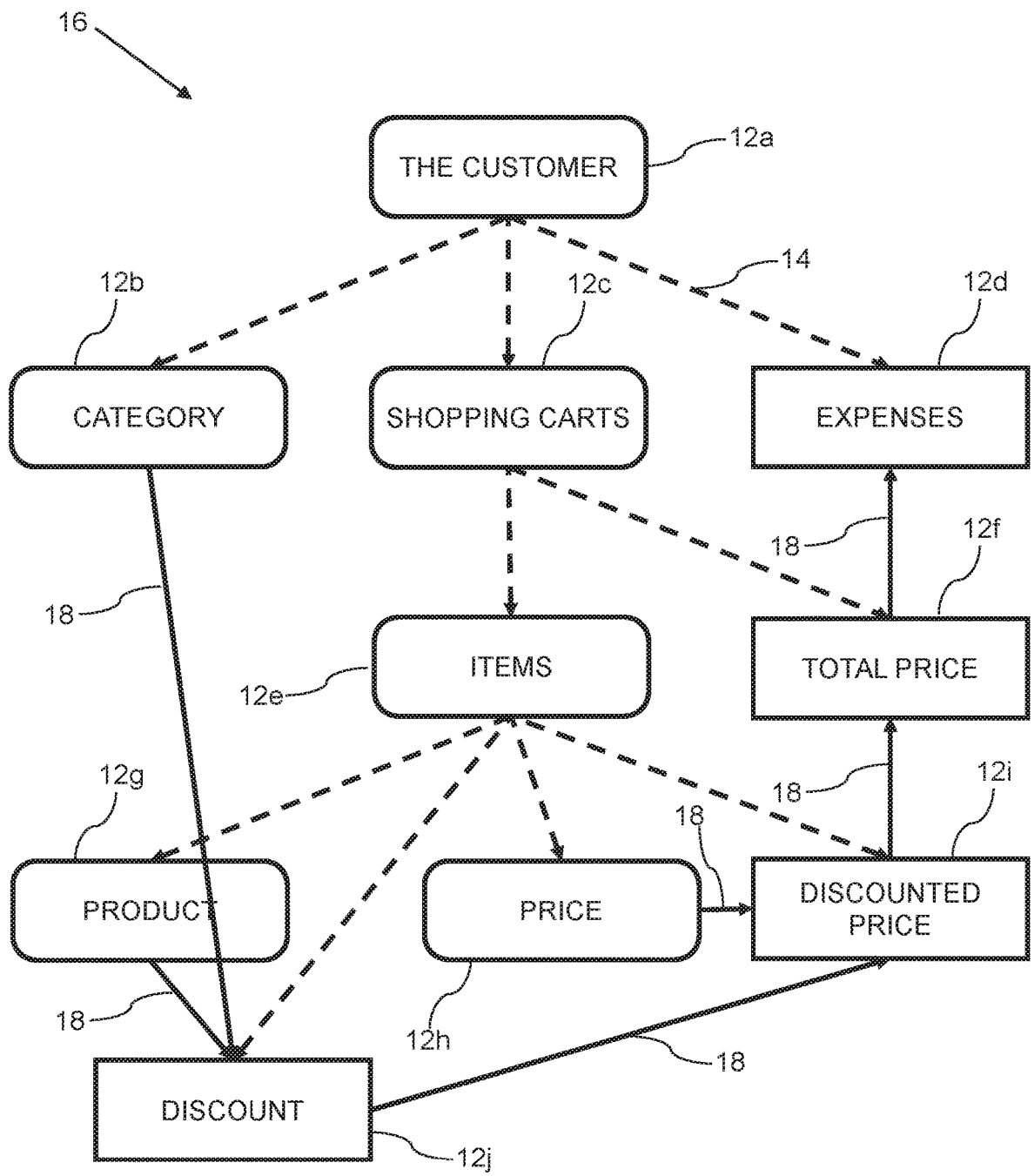
FIG. 2 is a schematic diagram of a dependency graph and the ownership graph, in accordance with an exemplary embodiment of the present invention.

FIG. 2 shows an example of a dependency graph 16, which has the same nodes 12 as the ownership graph 10 of FIG. 1, but has different edges 18. The dependency graph 16 depicted in FIG. 2 comprises a plurality of nodes 12 and directional edges 18, each edge 18 connecting two nodes 12 and indicating dependency of the one node 12 on the other node 12. The dependency graph is acyclic. The edges 14 (dashed lines) from the ownership graph 10 are still shown in FIG. 2, but do not form part of the dependency graph 16 which comprises the nodes 12 and the edges 18 (solid lines) only. For example, as the discounted price of an item depends on the discount of the item, there will be a dependency link 18 leading from the discount node 12j to the discounted price node 12i. There will also be a dependency link 18 leading from the price node 12h to the discounted price node 12i. Hence, the discounted price node 12i has two ingoing dependency links 18 and these dependencies are applied in an element-wise way. This means that the discounted price of an item depends on the price and discount of this same item, but not on the prices and discounts of the other items.

If dependencies involve decision families with different owner nodes 12, the relationship may nevertheless be given a precise semantics for those dependencies. For example, the discount of an item may not only depend on the product of the item, but also on the category of the customer. Furthermore, decision logic may be created that is applied to an individual decision in a decision family. For example, there may be a decision table defining the discount dependent of the product and the category.

However, the decision logic needs to be applied to all members in a decision family while taking the dependencies and ownership relation into account. For example, the decision logic for the discount node 12j needs to be applied to all owners, i.e., all items that are in some shopping cart of the given customer. In order to do so, the product and category need to be retrieved. For the product, this may be easy since this is an attribute of the same item. For the category this is more difficult since this is an attribute of the customer.

Other decisions may require the aggregation of individual decisions. For example, the total discounted price of a shopping cart depends on the discounted prices of items. When determining the discounted price of a shopping cart, the discounted prices for the items need to be retrieved, but only for those items that are in this shopping cart.

In order to make the decisions for all members in a decision family, it is necessary to apply the decision logic to each member of the family. For each member, it is necessary to retrieve the information required by the decision logic. The decision logic itself does not have any information for how to perform this retrieval. In other words, it lacks the definition of a scope that specifies that the decision logic is applied to all members of a decision family and determines all information that is needed to make the decision for an individual member and this is based on dependencies and ownership relations.

Figure 3:
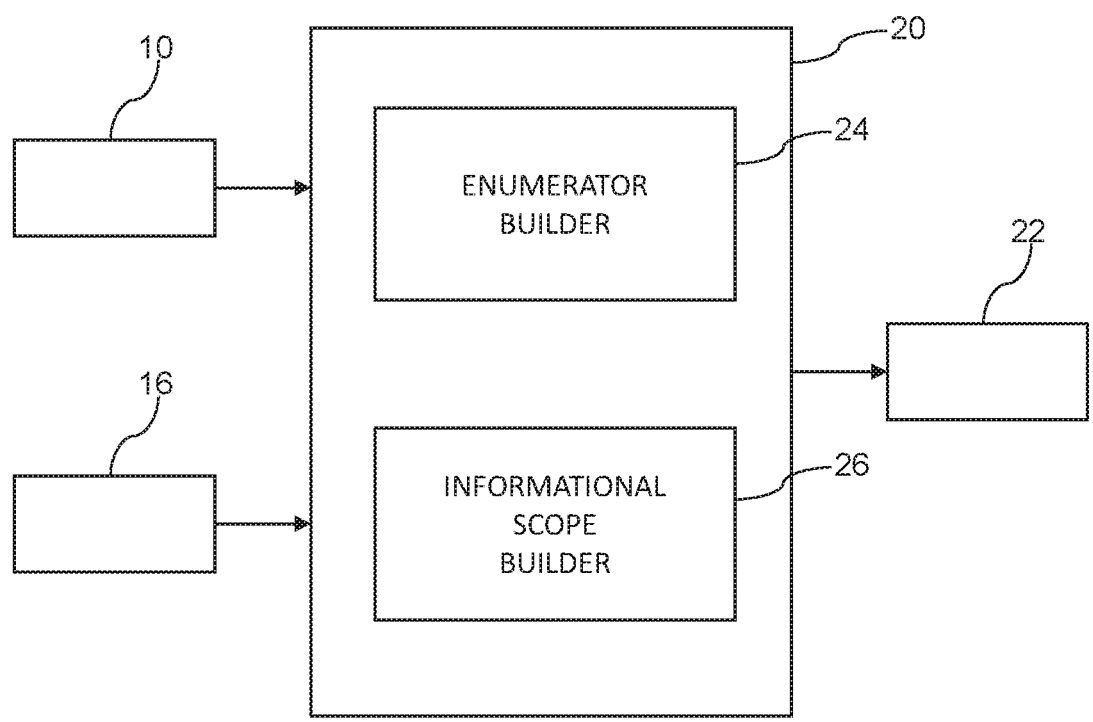
FIG. 3 is a schematic diagram of a system for computing scope definitions, in accordance with an exemplary embodiment of the present invention.

A system 20 is provided, as shown in FIG. 3, for computing scope definitions of decision logic based on ownership relations and dependency relations between attributes. A scope definition specifies that a decision logic is applied to all members of a decision family as well as the information that is needed for this purpose. This information is specified by path expressions that access attribute values of owner objects and by aggregators that collect values of path expressions for multiple objects that are related to an owner object.

The system 20 is provided with the ownership graph 10 of FIG. 1 and the dependency graph 16 of FIG. 2. Graphs 10 and 16 have the same nodes 12, which represent the path expressions. Both graphs need to be acyclic. Whereas the nodes 12 may have multiple parents, or owners, in the dependency graph 16, the nodes 12 may have at most one parent, or owner, in the ownership graph 10. Ownership relations need to be given and must not be decided, meaning that non-leaf nodes in the ownership graph 10 need to be root nodes in the dependency graph 16. The system 20 then computes a scope definition for each node 12. This scope definition is formulated in a formal language and represented by an abstract syntax tree (AST). Finally, in a first embodiment, the system 20 attaches the computed scope definitions to the given dependency graph 16 and returns the result as a scoped-decision graph 22.

The system 20 uses two components to compute different parts of the scope definition of a decision node 12. Firstly, an enumerator builder 24 visits all direct and indirect owner nodes 12 of the decision node 12 and adds an enumerating variable declaration for each of these owner nodes 12 to the scope definition under construction. The enumerating variable declaration makes sure that the variable will be instantiated for each owner in the object family of the respective owner node 12. Each enumerating variable declaration comprises a variable name, a variable type, and a path expression specifying a variable range. Secondly, an informational-scope builder 26 will add accessing variable declarations for all nodes 12 on which the decision node 12 depends (i.e., its parents or direct predecessors in the dependency graph 16). The accessing variable declarations access all information that may be used for making an individual decision in the decision family of the selected decision node 12. This information includes those members of the families of the parents that have the same direct or indirect owners as the decision. Each accessing variable declaration comprises a variable name and a path expression specifying the values of the variable. The variable declarations take the cardinalities of the nodes into account.

The approach using the system 20 has numerous advantages. Firstly, the approach integrates ownership relations into dependency diagrams. This provides an easy way to describe that certain decisions need to be made multiples times, namely for all objects that belong to a given owner. Hence, the approach integrates multiplicity and quantification into graphical models, supporting decision tables that do not involve any navigation or manipulation of objects. This leads to a clearer specification of the overall decision policy since the approach separates several aspects so that the ownership graph 10 specifies the families of decisions, the dependency graph 16 specifies the information that may be used for making decisions in a family, and the decision logic specifies how to make an individual decision.

Secondly, the approach automates the technical task of working out scope definitions. This task does not involve any business decisions, but is technically tedious. Scope definitions may involve complex navigations through an object model as well as aggregations if multi-valued attributes are involved. They require a clear understanding of relations between objects of different types. Hence, an analyst needs to look up an object model in addition to solving the main problem, which consists in defining decision logic for making an individual decision. Whereas the former is a purely technical problem, the latter requires business decisions such as figuring out decision boundaries in the case space and to express them by adequate rule conditions. Both tasks are different in nature and require different sources of information. In particular, it is often confusing for analysts that a textual representation of rules starts with a scope definition. As such, an analyst needs to work out those technical issues before being able to define the proper decision logic and to decide for which cases which decision should be made. The system 20 thus allows an analyst to start right with the decision logic for individual decisions. As the system 20 automatically computes the scope definitions, the system 20 removes difficult work from a business analyst who can focus on things that require business decisions.

Thirdly, the scope definitions are updated automatically if dependencies are added or removed. Fourthly, the system 20 provides a clean modelling of ownership relations and avoids nested tables and indices of indices. Ownership relations are specified in a graphical form together with dependencies and thus avoids complex indexing techniques. Finally, the approach is relevant for graphical models in general (influence diagrams, Bayesian networks) and thus has value beyond rule-based decision policies.

The system 20 will now be described in more detail using an example, namely that of deciding the discounts of items in multiple shopping carts, as per the graphs of FIGS. 1 and 2.

A customer may, for example, create a shopping cart for each supermarket the customer visits. Each one of these shopping carts contains several items which are characterized by a product name and a price. One task consists of determining the total expenses of the customer. These total expenses are the sum of the total prices for each shopping cart and the total price of a shopping cart is the sum of the discounted prices of all items in the respective shopping cart. The discounted price of an item depends on the price and discount of each item and the latter depends on the product of this item and the category of the customer.

This example involves several objects, which can be grouped into three families of objects. The first family has only a single member, namely the customer. The members of this family are not owned by any other object. The second family consists of all the shopping carts of this customer. Each member of this family is owned by some member of the customer family, meaning that there is an ownership relation between the customer family and shopping cart family. The third family consists of all items that belong to a shopping cart of this customer. Each member of this family is owned by a member of the shopping cart family, meaning that there is an ownership relation between the shopping cart family and the items family.

This example requires that several decisions are made. Some of these decisions concerns objects of a similar kind. For example, it will be necessary to determine a discount for each item that belongs to a shopping cart of the customer. This constitutes a first family of decisions. Each member of this family is owned by a member of the item family, meaning that there is an ownership relation between the item family and the discount family. Furthermore, it will be necessary to determine a discounted price for each item that belongs to a shopping cart of the customer. This constitutes a second family of decisions. Again, each member of this family is owned by a member of the item family, meaning that there is an ownership relation between the item family and discounted-price family. Then it will be necessary to determine the total price for each shopping cart of the customer. This constitutes a third family of decisions. Each member of this family is owned by a member of the shopping-cart family, meaning that there is an ownership relation between the shopping-cart family and total-price family.

Finally, it will be necessary to determine the expenses of the customer. Although there is only a single decision of this kind, it will be considered a family of decisions as well. This fourth family of decisions has a single member. Each member of this family is owned by a member of the customer family, meaning that there is an ownership relation between the customer family and the expenses family.

These decisions are made for a given case, which consists of different data. Some of the data concerns objects of a similar kind. For example, there is the product for each item that belongs to a shopping cart of the customer. This constitutes a first family of data. Each member of this family is owned by a member of the item family, meaning that there is an ownership relation between the item family and the product family. Furthermore, there is the list price for each item that belongs to a shopping cart of the customer. This constitutes a second family of data. Again, each member of this family is owned by a member of the item family, meaning that there is an ownership relation between the item family and the list-price family. Then there is the category of this customer. Although there is a single datum of this kind, it will be considered a family of data as well. This third family of decisions has a single member. Each member of this family is owned by a member of the customer family, meaning that there is an ownership relation between the customer family and the category family.

The diverse ownership relations are represented by the ownership graph 10 of FIG. 1. This ownership graph has a node 12 for each object family, for each decision family, and for each data family. The ownership graph 10 has an edge 14 from one node 12 to another node 12 if there is an ownership relation between the family of the first node 12 and the family of the second node 12. Each family has at most one owner, meaning that each node 12 in the ownership graph 10 has at most one ingoing edge 14. Furthermore, a family cannot own itself whether it is directly or via a sequence of intermediate owners. Therefore, the ownership graph 10 is acyclic. Given these properties, the ownership graph 10 constitutes a forest in graph theory. All ownership relations are given, meaning that decision nodes are leaf nodes of this forest.

As explained above, each decision depends on other decisions and on the relevant data. For example, the discounted-price decision (node 12 *i*) for an item depends on the discount of the item (node 12 *j*). Hence, each member of the discounted-price family, depends on a member of the discount family owned by the same item object. This corresponds to a dependency relation between the discount family and the discounted-price family. Moreover, the discounted-price decision for an item in the shopping cart of the customer depends on the price (node 12 *h*) of this item. Hence, each member of the discounted-price family depends on a member of the price family with the same item as owner. This corresponds to a dependency relation between the discount family and the discounted-price family. Furthermore, the discount decision for an item depends on the product (node 12 *g*) of the item. Hence, each member of the discount family depends on a member of the product family and owned by the same item object. This corresponds to a dependency relation between the product family and the discount family.

It should be noted that each of these three dependency relations is constrained by the ownership relation. If there is a dependency relation between a first family and a decision family and both families are owned by an object family, then a member in the decision family may depend only on those members in the first family that are owned by a member of the object family that also owns the decision.

The discount decision for an item in the shopping cart of the customer also depends on the category (node 12*b*) of this customer. Hence, each member of the discount family depends on a member of the category family and these members have the same customer as indirect owner. This corresponds to a dependency relation between the category family and the discount family. As the same category may be used by different discount decisions, this relation has a one-to-many cardinality. Moreover, this dependency relation is not constrained by direct ownership as the product has the customer as owner and the discount has an item as owner. Instead, it is constrained by indirect ownership. The indirect ownership relation can be obtained from the ownership relation by taking the transitive closure of the latter.

The constraint on the dependency relation is then obtained from the original version by replacing ownership by indirect ownership. If there is a dependency relation between a first family and a decision family and both families are indirectly owned by an object family, then a member in the decision family may depend only on those members in the first family that are indirectly owned by a member of the object family that also indirectly owns the decision. Note that if this constraint is satisfied for an object family and this object family is owned by another object family then this constraint is also satisfied by this other object family. For this reason, it is sufficient to verify the constraint for the most-direct owner of the two families that have a dependency relation.

There are further dependency relations in the example. The total price (node 12*f*) of a shopping cart of the customer depends on the discounted prices (node 12*i*) of all items in this shopping cart. Hence, each member of the total-price family depends on a member of the discounted-price family and these members have the same shopping-cart (node 12*c*) as indirect owner. This corresponds to a dependency relation between the discounted-price family and the total-price family. As the different discounted-price decisions may be used for making the same total-price decision, this relation has a many-to-one cardinality. Hence, this relationship differs in this aspect from the dependency relation between the category family and the discount family. In spite of this difference, it is constrained by the indirect ownership relation in the same way as the latter. It should be noted that the constraint on indirect ownership implies the constraint on direct ownership. For this reason, it is sufficient to consider only one kind of dependency relation, namely the one that is constrained by the indirect ownership relation.

Finally, there is a dependency relation between the total-price family and the expenses family as the expenses (node 12*d*) of the customer depend on the total prices (node 12*f*) of the shopping carts of this customer.

The dependency relations between the different families are represented by the dependency graph 16 of FIG. 2. This graph 16 has the same nodes 12 as the ownership graph 10. The dependency graph 16 has an edge 18 from one node 12 to another node 12 if there is a dependency relation between the family of the first node 12 and the family of the second node 12. As explained above, such a dependency relation is constrained by the indirect ownership relation. The dependency graph 16 is depicted in FIG. 2 together with the ownership graph 10 (the bold edges 18 are the dependency arcs and the dashed edges 14 are the ownership arcs).

Figure 4:
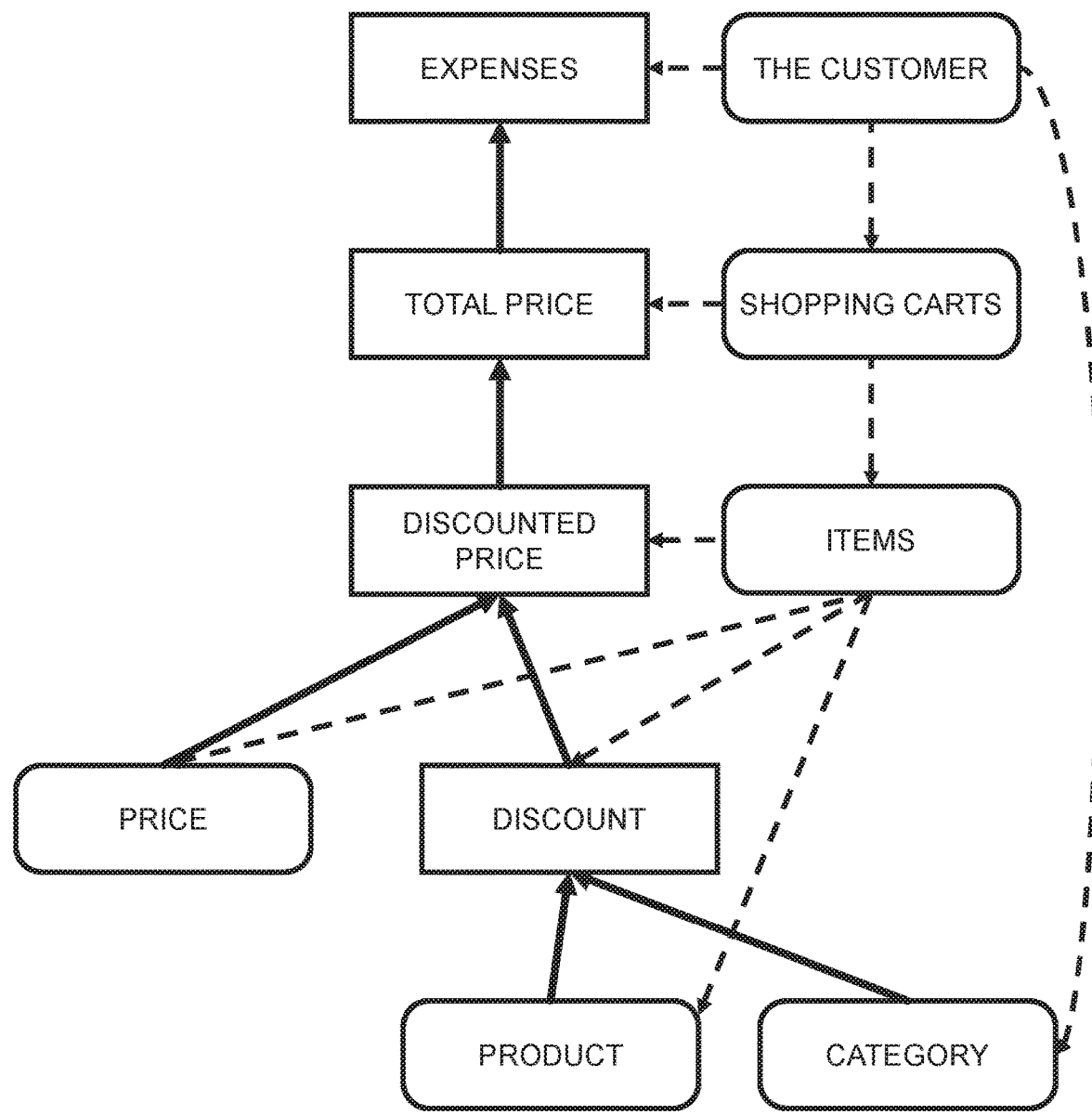
FIG. 4 is a schematic diagram of a decision-oriented layout of the graphs of FIGS. 1 and 2, in accordance with an exemplary embodiment of the present invention.

FIG. 4 shows a decision-oriented layout of the graphs 10 and 16, which shows a different layout of the graphs 10 and 16, which puts the final decision node 12 towards the top of FIG. 4 and the data nodes 12 towards the bottom of FIG. 4.

Figure 5:
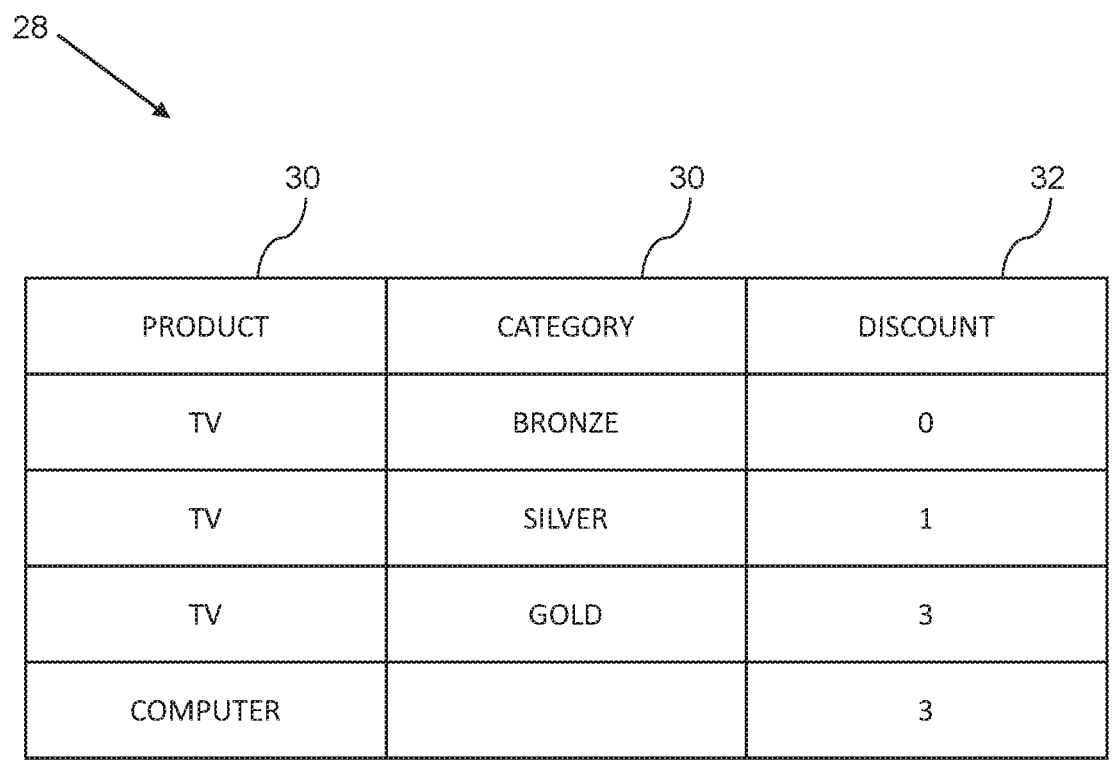
FIG. 5 is a schematic diagram of a decision table for a discount decision, in accordance with an exemplary embodiment of the present invention.

The dependency graph 16 is acyclic. Nodes 12 for object families and nodes 12 for data families cannot have ingoing edges 18 and are the roots of this graph 16. Nodes 12 for decision families may have ingoing and outgoing edges. Each decision family has an associated decision logic that defines which decision is made depending on other decisions as well as data. Such a decision logic is formulated over variables representing this information. Those variables may be single-valued or multi-valued. For example, the decision logic for making a discount decision is formulated over a variable representing a product and another variable representing the category. It may have the form of a decision table 28 such as the one given in FIG. 5, which is a decision table 28 for the discount decision, with condition columns 30 and an action column 32. The table 28 specifies which discount should be chosen for which product and category.

The decision logic may also be a formula applied to a single-valued, or multi-valued, variable. For example, the discounted price may be determined by deducing the discount that is the value of a single-valued variable 'discount' from the value of a single-valued variable 'price', as follows:

'discounted price'=('price'*(100−'discount'))/100

For example, the total price may be determined by a sum over the values of the multi-valued variable 'discounted prices', as follows:

'total price'=sum('discounted prices')

It should be noted that a decision logic does not provide information about ownership relations. Indeed, the decision logic lacks the definition of a scope that specifies that the decision logic is applied to all members of a decision family and determines all information that is needed to make the decision for an individual member and is based on dependencies and ownership relations. The scope of a decision logic needs to be derived from the ownership graph 10. The scope definition specifies that a decision needs to be made for all owners of the decision family. For the discounted-price family, this requires variable declarations such as:
 definitions:
 set 'shopping cart' to a shopping cart;
 in the shopping carts of 'customer';
 set 'item' to an item in the items of 'shopping cart';

These variable declarations ensure that the decision logic of the discounted-price family will be instantiated for each shopping cart of the customer and each item of this shopping cart if a concrete case is given. Furthermore, the scope definition needs to access the member in the discount family that has the same owner as the decision as well as the member in the price family that has this owner. This can be achieved by the following variable declarations:
 set 'discount' to the discount of 'item';
 set 'price' to the price of 'item';

The scope definition of the discounted-price family therefore has the following form.
 definitions:
 set 'shopping cart' to a shopping cart;
 in the shopping carts of 'customer';
 set 'item' to an item in the items of 'shopping cart';
 set 'price' to the price of 'item';
 set 'discount' to the discount of 'item';

When combined with the decision logic of the discounted-price family, this results in the following rule. The action part of this rule consists of the formula for computing the discounted price, which constitutes the decision logic for the discounted-price family. Furthermore, there is an action that stores the result in the corresponding attribute of the owner object:
 definitions:
 set 'shopping cart' to a shopping cart;
 in the shopping carts of 'customer';
 set 'item' to an item in the items of 'shopping cart';
 set 'price' to the price of 'item';
 set 'discount' to the discount of 'item';
 then,
 'discounted price'=(price*(100−discount))/100;
 set the discounted price of 'item' to 'discounted price';

Alternatively, the variable discounted price can be substituted by the path expression the discounted price of 'item', thus leading a rule having a single action:
 definitions:
 set 'shopping cart' to a shopping cart;
 in the shopping carts of 'customer';
 set 'item' to an item in the items of 'shopping cart';
 set 'price' to the price of 'item';
 set 'discount' to the discount of 'item';
 then,
 set the discounted price of 'item' to ('price'*(100−'discount'))/100;

Such a rule can be executed by a suitable rule engine. This rule is formulated over path expressions instead of variables and thus requires more effort to read than the simple discount calculation formula given before.

The discount family depends on the product family and on the category family. The discount family scope definition will again have variable declarations that ensure that the decision logic is instantiated for all items in all shopping carts of the customer. Furthermore, the scope definition needs to access the members in the product family that have the same owner as the decision, as well as the member in the category family that has an indirect owner in the customer family that is also an indirect owner of the decision. As this is the single customer object and as the product is directly owned by it, it is sufficient to access the product in the following way:
 set 'category' to the category of 'customer';

This leads to the following scope definition for the discount family. In a suitable rule language, this scope definition can be added as a precondition of the decision table that constitutes the decision logic of the discount family:
 definitions:
 set 'shopping cart' to a shopping cart;
 in the shopping carts of 'customer';
 set 'item' to an item in the items of 'shopping cart';
 set 'product' to the product of 'item';
 set 'category' to the category of 'customer';

The total-price family depends on the discounted-price family. The scope definition specifies that the decision needs to be made for all shopping carts of the customer:
 definitions:
 set 'shopping cart' to a shopping cart;
 in the shopping carts of 'customer';

Furthermore, the scope definition needs to access the members in the discounted-price family that have an indirect owner in the shopping-cart family that is also an indirect owner of the total-price decision. It is therefore necessary to collect the discounted prices of all items of the shopping cart. This can be achieved by an aggregation operator that constructs an appropriate collection:

definitions:
set 'shopping cart' to a shopping cart;
in the shopping carts of 'customer';
set 'discounted prices' to;
the discounted prices of the items of 'shopping cart';

The multi-valued variable 'discounted prices' contains the discount price of each item in the items of the customer. It is supposed that the rule language is expressive enough to define this collection in an adequate way (either by a direct syntax as above or by an appropriate aggregate operator). This scope definition can then be combined with the decision logic for the total-price family, thus leading to the following rule:

definitions:
set 'shopping cart' to a shopping cart;
in the shopping carts of 'customer';
set 'discounted prices' to;
the discounted prices of the items of 'shopping cart';
then,
'total price'=sum('discounted prices');
set the total price of 'shopping cart' to 'total price';

The system 20 is able to compute the scope definitions. The system 20 is provided with the ownership graph 10 and the dependency graph 16 which have the same nodes 12 and which satisfy the properties listed above. The nodes 12 represent object families, decision families, and data families. The ownership graph 10 is a forest and the dependency graph 16 is a directed acyclic graph. Nodes 12 for decision families are leaf nodes of the ownership graph 10. Nodes 12 for object families and for data families are root nodes 12 of the dependency graph 16. The output of the system 20 is a scoped-decision graph 22, which consists of the ownership graph 10, the dependency graph 16, and a scope definition for each node 12. Each scope definition consists of one or more variable declarations. Each variable declaration specifies the name and type of the variable and a path expression, or collector expression, for computing its range or value. Those scope definitions are formulated in a formal language and represented by an abstract syntax tree (AST).

Figure 6:
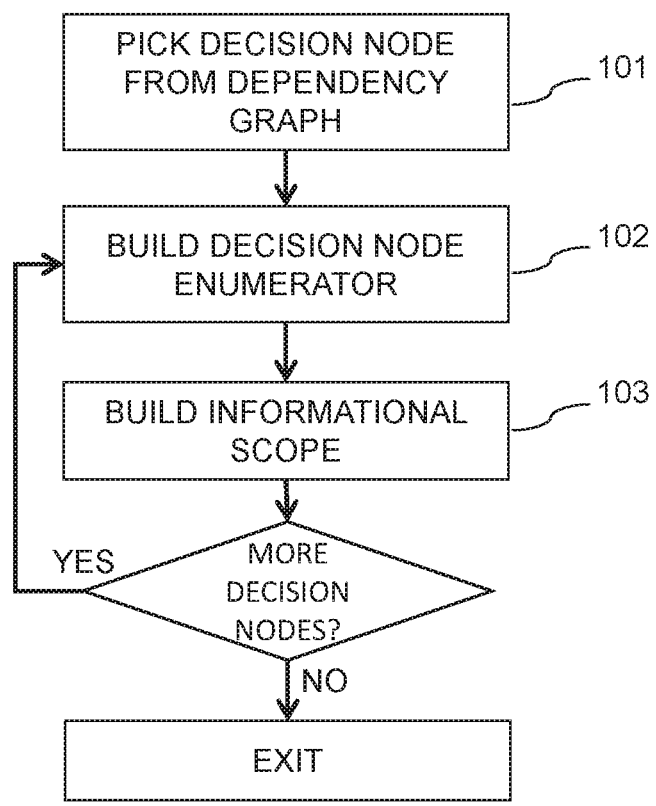
FIG. 6 is a flowchart of a method for creating a scoped-decision graph, in accordance with an exemplary embodiment of the present invention.

FIG. 6 shows a flowchart for creating the scoped-decision graph 22 and shows the flowchart of operation of the scoped-decision graph builder system 20. The system 20 computes a scope definition for each decision node 12 (which in the specific example of FIGS. 1 and 2 are the nodes 12d, 12f, 12i and 12j). A decision node 12 is a node in the dependency graph 16 with an incoming edge 18. The system 20 starts at step 101 by selecting a decision node 12 from the dependency graph 16. This node 12 represents a decision family and the decisions in this family are made depending on the members of other nodes 12, namely the parents of the selected node 12 within the dependency graph 16. The scoped-decision graph builder system 20 initializes the scope definition of the selected decision node by creating an empty scope definition. The scoped-decision graph builder then uses the enumerator builder 24 and the informational-scope builder 26 in order to expand this scope definition. The enumerator builder 24 at step 102 creates enumerating variable declarations for all nodes 12 on the path of a root node 12 to the owner node 12 of the decision node 12. These variable declarations ensure that each decision in the decision family is made. The informational-scope builder 26 at step 103 creates accessing variable declarations for all parents of the decision node 12 in the dependency graph. These variable declarations will have the following effect: when making a particular decision in the considered decision family, only those members of the families of the parent nodes 12 that have the same direct or indirect owners as this decision will be accessed. The operation of the enumerator builder 24 and the informational-scope builder 26 will be explained below in detail. The scoped-decision graph builder system 20 then attaches the scope definition to the selected decision node 12 in the dependency graph 16. The system 20 then repeats these steps by selecting another decision node 12. Once the system 20 has processed all decision nodes 12 of the dependency graph 16 in this way, all decision nodes 12 have a scope definition, meaning that the computation is completed.

The enumerator builder 24 is supplied with the selected decision node 12, the current scope definition, and the ownership graph 10. The enumerator builder 24 adds enumerating variable declarations to the scope definition.

Figure 7:
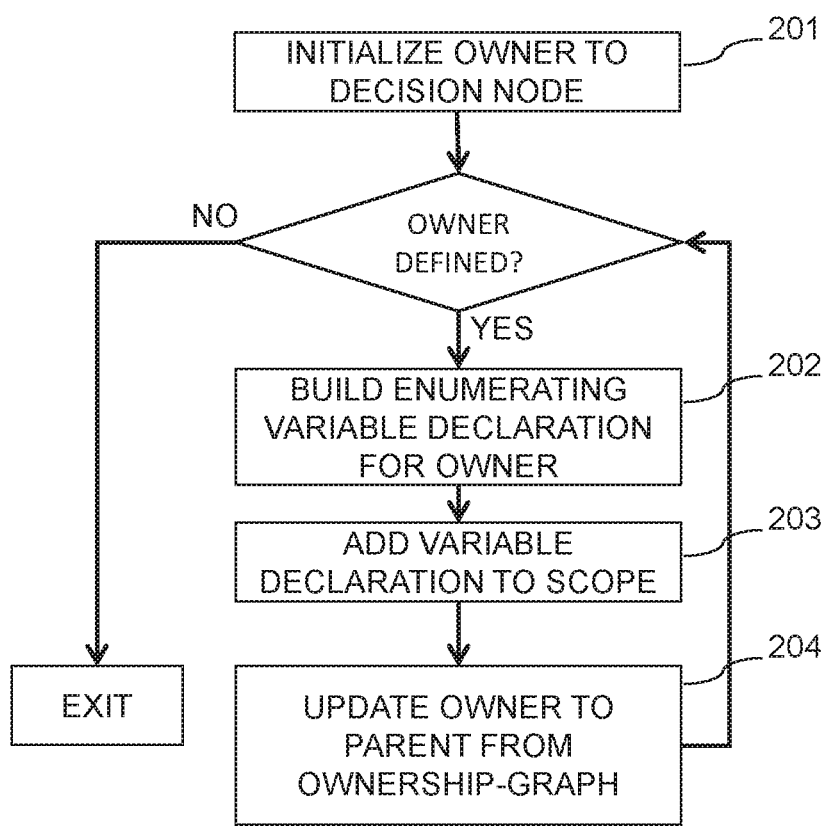
FIG. 7 is a flowchart of a method for building a decision node enumerator, in accordance with an exemplary embodiment of the present invention.

FIG. 7 is a flowchart of the operation of the decision node enumerator 24. The selected decision node 12 represents a family of decisions. The scope definition needs to include variable declarations that ensure that decision logic for this node 12 will be applied to all members of this decision family. For this purpose, the scope definition will include an enumerating variable declaration for each node 12 on the path from a root node 12 in the ownership graph 10 to the owner node 12 of the considered decision node 12.

The enumerator builder 24 visits these nodes 12 in inverse order by starting with the owner node 12 of the decision node 12 and ending with the root node 12 and builds an enumerating variable declaration for each of the nodes 12 that are encountered. The enumerator builder 24 starts this process at step 201 by initializing the current owner node 12 by the owner node 12 of the selected decision node 12. If the current owner node 12 is defined, the enumerator builder 24 at step 202 will create an enumerating variable declaration for the node 12. The enumerating variable declaration consists of a variable name, a type, and a path expression specifying the range of the variable. Such a variable declaration describes alternative ways to bind the variable to a single value. Indeed, the variable may be bound to each value in the range that is obtained by evaluating the path expression and each of these possibilities will be considered when evaluating the enumerating variable declaration. The path expression must describe the object family associated to the current owner node. If the current owner node 12 is a root node 12, this family is given by the value(s) of a global variable and this global variable is used as a path expression. In all other cases, the current owner node 12 has itself an owner node 12 and there will be a local variable denoting the different objects in the family of this second owner node 12. The path expression will then consist of the attribute characterizing the current owner node 12 and the variable of the owner node 12 of the current owner node 12. The enumerator builder 24 at step 203 then adds the variable declaration to the beginning of the scope definition. If the current owner node 12 is not a root node 12 of the ownership graph 10, then the enumerator builder 24 at step 204 sets the current owner node 12 to the owner node 12 of the current owner node 12 and repeats the steps above for this new node 12.

Otherwise, the enumerator builder 24 has computed an enumerating variable declaration for each node 12 on the path from the root node 12 to the owner node 12 of the selected decision node 12 and the variable declarations have been arranged in this order. When evaluating these variable declarations, the first declaration will evaluate the different bindings of the root node 12, i.e., one for each member in the object family of the root node 12. The second declaration will be evaluated under each of these bindings and lead to different bindings of the second variable of the scope definition, namely one for each child of the selected member of the root node family. This is repeated for each level and the evaluation will enumerate the different objects in a tree-like manner. In the end, this guarantees that all members in the considered decision family will be enumerated and that all owners on the path to the root node 12 can be accessed as values of their respective variables. It should nevertheless be noted that the enumerator builder 24 does not perform this tree-like enumeration itself. The enumerator builder 24 just creates the variable declarations that permit a subsequent rule engine to perform such a tree-like enumeration.

The informational-scope builder 26 is supplied with the selected decision node 12, the current scope definition, the dependency graph 16, and the ownership graph 10. The informational-scope builder 26 adds accessing variable declarations to the scope definition.

Figure 8:
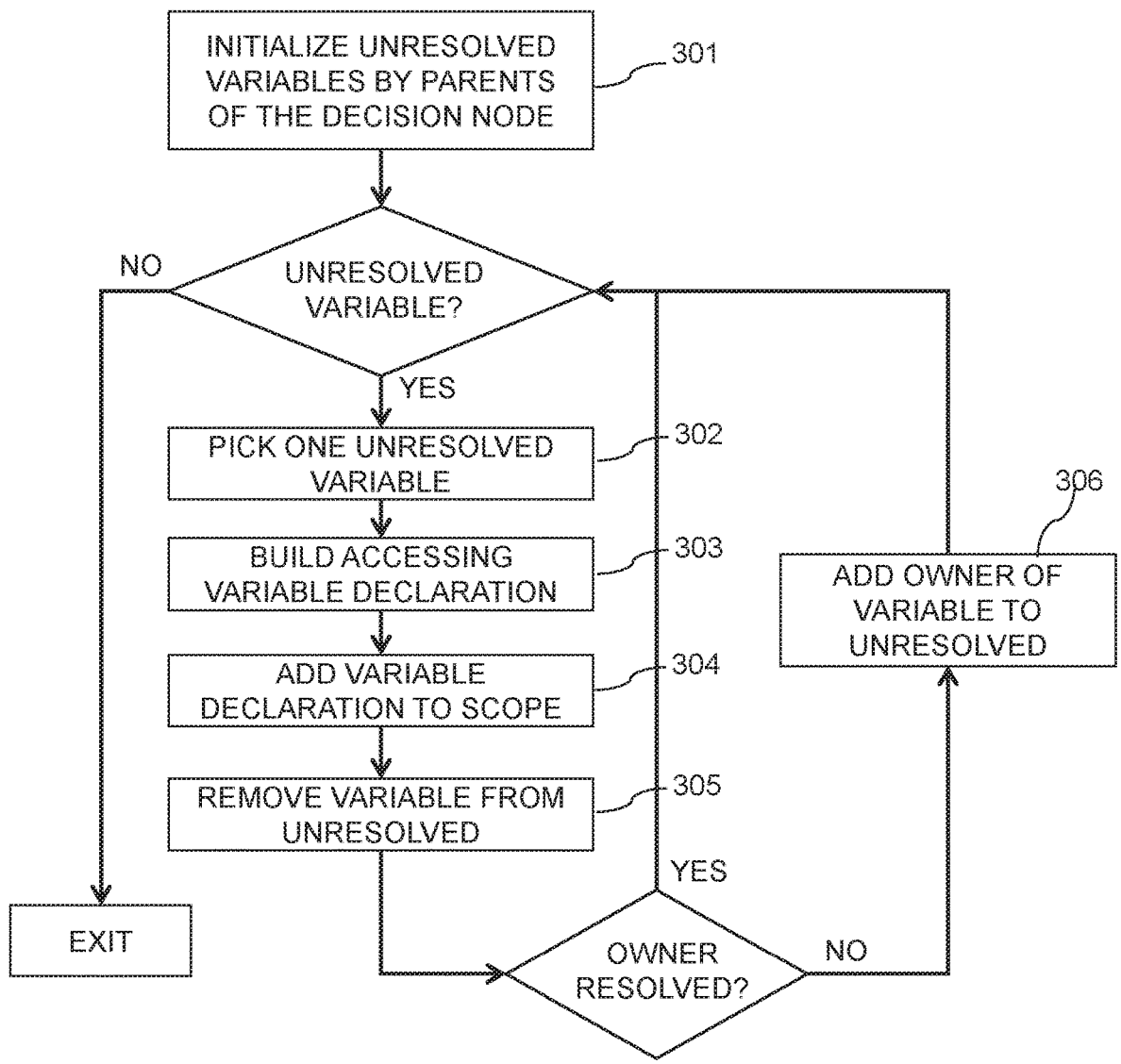
FIG. 8 is a flowchart of a method for building an informational scope, in accordance with an exemplary embodiment of the present invention.

FIG. 8 shows a flowchart of the operation of the informational-scope builder 26. The decisions in the considered decision family are made depending on the members of other nodes 12, namely the parents of the selected node 12 within the dependency graph 16. The scope definition therefore needs variable declarations for accessing these members. As explained above, a particular decision in the considered family of decisions does not depend on all members of the parents, but only on those members that have a common direct, or indirect, owner. As the current scope definition already includes variable declarations for these owners, it is sufficient to use the values of these variables for accessing the members of the parent nodes.

The informational-scope builder 26 creates a list of unresolved nodes 12 for which the informational-scope builder 26 needs to add an accessing variable declaration to the scope definition. The informational-scope builder 26 at step 301 initializes this list by the parents of the selected node 12 within the dependency graph 16. If there are unresolved nodes 12, the informational-scope builder 26 at step 302 picks one of these nodes 12 from the list of unresolved nodes 12. The informational-scope builder 26 at step 303 then resolves this node 12 by constructing an accessing variable declaration. An accessing variable declaration consists of a variable name and a path expression specifying the values of the variable. Such a variable declaration describes a single way to bind the variable to one of more values. Whereas the evaluation of an enumerating variable declaration may result in multiple bindings, which will all be explored in different branches of an enumeration tree, the evaluation of an accessing variable declaration results in a single binding and the evaluation process will not branch. The path expression must describe the family associated to the picked node 12. As before, if this node 12 is a root node 12, this family is given a value of a global variable and this global variable is used as a path expression. In all other cases, the picked node 12 has itself an owner node 12 and there will be a local variable denoting the different objects in the family of this owner node 12. The path expression will then consist of the attribute characterizing the picked node 12 and the variable of the owner node 12 of the picked node 12. The variable of the owner node 12 may be multi-valued. In that case, the path expression will behave like a collector expression when being evaluated. The informational-scope builder 26 will collect the attribute values for all objects that are among the values of the multi-valued variables. The evaluation will result in a list of all these attribute values.

The informational-scope builder 26 at step 304 then adds the variable declaration to the end of the scope definition, if the variable of the picked node 12 is not used in the current scope decision. Otherwise, the informational-scope builder 26 inserts the variable declaration before the first variable declaration that uses the newly declared variable. At step 305, the current node 12 is removed from the list of unresolved nodes After this, the informational-scope builder 26 checks whether the picked node has an owner node in the ownership graph 10 and whether the owner node 12 needs to be resolved. If the owner node 12 already has a variable declaration in the current scope definition, the node 12 does not need to be resolved anymore. In particular, if the owner node 12 is a common owner node 12 of both the picked node 12 and the selected decision node 12, this common owner node 12 will have an enumerating variable declaration that has been constructed by the enumerator builder 24. The evaluation of this variable declaration will lead to different branches. In each branch, the variable of the owner node 12 will be bound to a single object and this object must be a common owner of the members of the decision family that will be considered in this branch and the members of the families of its parent's nodes 12 that will be considered in this branch.

The fact that enumerating variable declarations are created before accessing variable declarations thus guarantees the satisfaction of the ownership constraint, which has been evoked before. However, if the owner node does not have a variable declaration in the current scope definition, the informational-scope builder 26, at step 306 will add the owner node 12 to the list of unresolved nodes 12. In all cases, the steps of FIG. 8 will be repeated as long as there are unresolved nodes 12. Once all nodes 12 have been resolved, the informational-scope builder 26 returns.

The process steps shown in the flowcharts of FIGS. 6 to 8 that are performed by the system 20 are now explained for the example graphs 10 and 16 of FIGS. 1 and 2. The scoped-decision graph builder system 20 is supplied with the dependency graph 16 and the ownership graph 10 displayed in FIG. 2 which shows the dependency graph 16 with the additional ownership relations.

In the first step 101, the scoped-decision graph builder system 20 selects any decision node, 12, for example the discounted-price node 12i. The system 20 creates an empty scope definition and invokes the enumerator builder 24 by passing the discounted-price node 12i, the currently empty scope definition, and the ownership graph 10. The enumerator builder 24 at step 201 initializes the current owner by the item node 12e, which is the owner node 12e of the discounted-price node 12i. The enumerator builder 24 at step 202 then creates an enumerating variable declaration for this owner node 12e.

Figure 9:
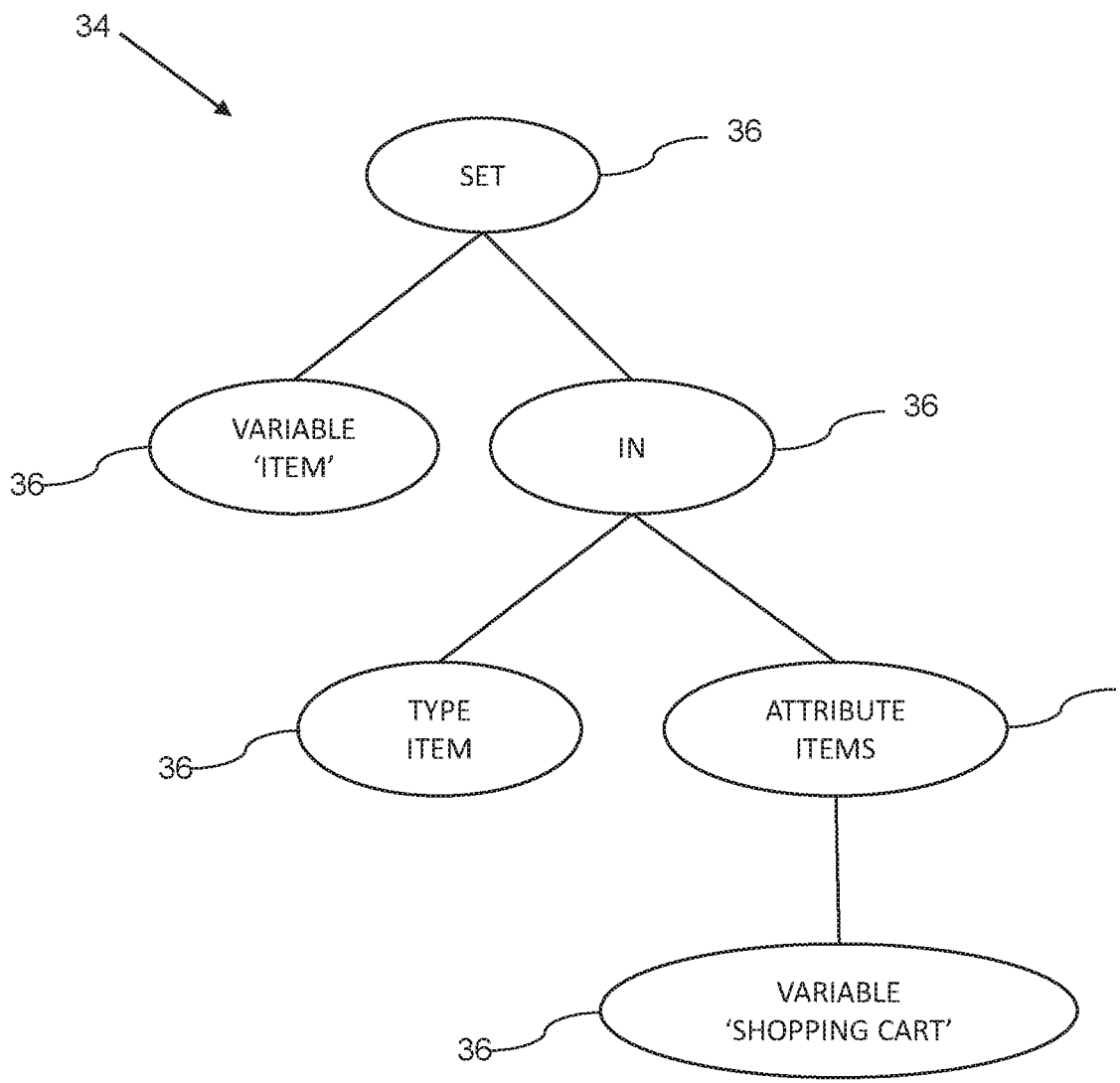
FIG. 9 is an abstract syntax tree (AST) of an enumerating variable declaration, in accordance with an exemplary embodiment of the present invention.

This variable declaration consists of the variable name 'item', the type Item, and a path expression denoting a range of values for this variable. Since the item node 12e is not a root node 12, the path expression consists of the items attribute of the shopping-cart node 12c, which is the owner node 12 of the item node 12e, and the variable for the shopping-cart node 12c. The AST of this variable declaration is shown in FIG. 9 which shows the AST 34 of an enumerating variable declaration, comprising the various AST nodes 36. The enumerator builder 24 at step 203 adds the resulting variable declaration to the beginning of the scope definition. The textual form of this scope definition is:
    definitions:
    set 'item' to an item in the items of 'shopping cart';

The enumerator builder 24 then sets the current owner node 12 to the shopping-cart node 12c, which is the owner node 12 of the item node 12e. The enumerator builder 24 now creates an enumerating variable declaration for the shopping-cart node 12c in a similar way as before. As the shopping-cart node 12c has an owner node 12, namely the customer node 12a, this variable declaration consists of the variable name 'shopping cart', the type Shopping cart, and a path expression consisting of the shopping-cart attribute of the customer node 12a as well as a variable for the customer node 12a. The enumerator builder 24 then adds this variable declaration to the beginning of the scope definition:

definitions:
set 'shopping cart' to a shopping cart;
in the shopping carts of 'customer';
set 'item' to an item in the items of 'shopping cart';

Next, the enumerator builder 24 sets the current owner node 12 to the customer node 12a as this is the owner node 12 of the shopping-cart node 12c. As the customer node 12a is a root node 12, this node 12a will have a global variable 'the customer'. The enumerator builder 24 will build an enumerating variable declaration that consists of a local variable name 'customer', the type Customer, and a path expression which simply consists of the global variable 'the customer'. As the object family of the customer node 12a contains only one customer object, this global variable is single-valued, meaning that the path expression describes a range which is a singleton. This may be indicated by using a from-keyword in the variable declaration. The enumerator builder 24 then adds the variable declaration to the scope definition:

definitions:
set 'customer' to a customer from 'the customer';
set 'shopping cart' to a shopping cart;
in the shopping carts of 'customer';
set 'item' to an item in the items of 'shopping cart';

Since the range is a singleton, there is only one possible way to bind the local variable 'customer' to a value. Hence, the first variable declaration is not actually needed. In some embodiments, this declaration may be omitted and the global variable for the customer node 12a may be used instead of the local variable. As the customer node 12a has no owner node 12, the enumerator builder 24 will set the current owner node 12 to an undefined value. As such, the current owner node 12 is no longer defined, meaning that the enumerator builder 24 has finished its processing.

The enumerator builder 24 has produced a scope definition that can be evaluated. This evaluation will lead to an enumeration tree consisting of three levels. Firstly, the path expression 'the customer' will be evaluated and results in a singleton that contains the given customer object. The local variable 'customer' will be bound to this customer object. This will set up a single branch of the evaluation process. Secondly, the path expression the shopping carts of 'customer' will be evaluated under the given variable binding of the 'customer' variable. This will result in a range that contains all the shopping-cart objects of the given customer object. The local variable 'shopping cart' will be bound to each of these values and each of these bindings will lead to a new branch of the evaluation process. In each of these branches, the variable 'shopping cart' is thus bound to a different value. Thirdly, the path expression for the items of 'shopping cart' will be evaluated in each of the branches. This will result in a range that contains all the items of the shopping-cart object to which the 'shopping cart' variable is bound. The local variable 'item' will be bound to each of these values and each of these bindings will lead to a new branch of the evaluation process. In each of these branches, the variable 'item' is thus bound to another value.

The different branches of the evaluation process thus enumerate the members of the decision family of the discounted-price node 12i. Such a member is characterized by its direct and indirect owners. Those owners have been selected by binding the corresponding owner variables to appropriate values. These owners are thus able to constrain the selection of the values of the parent nodes 12 of the discounted-price node 12i in the dependency graph 16.

Figure 10:
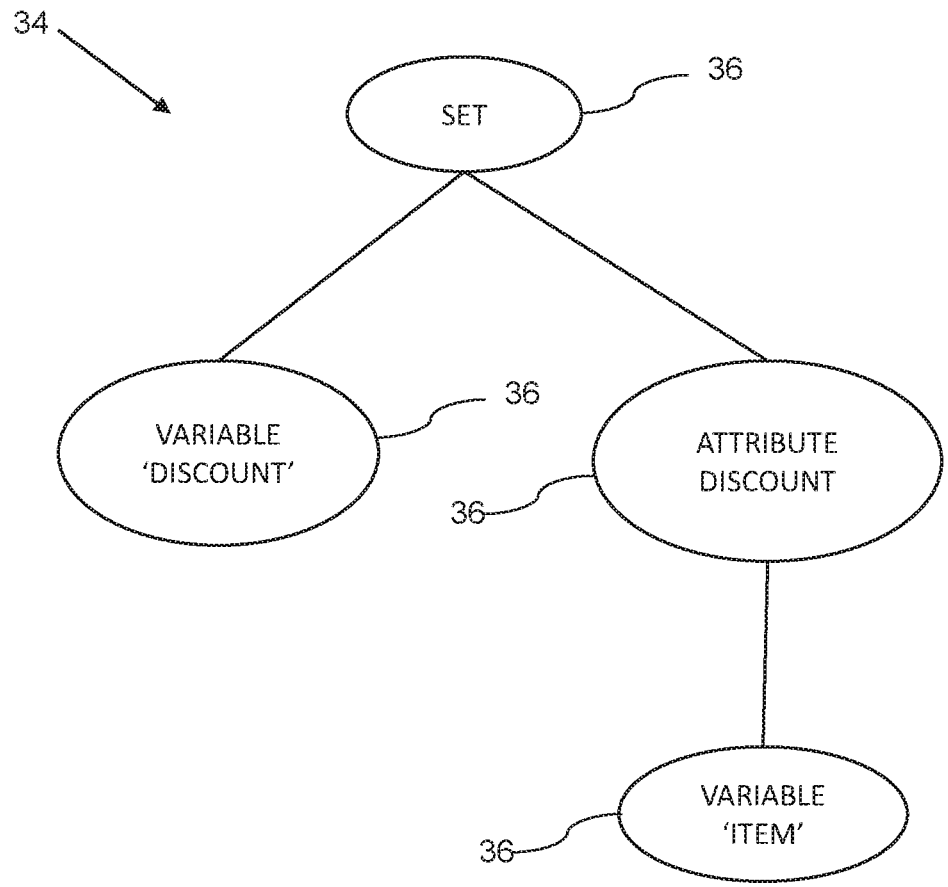
FIG. 10 is an AST of an accessing variable declaration, in accordance with an exemplary embodiment of the present invention.

The informational-scope builder 26 is creating accessing variable declarations that respect those constraints. The informational-scope builder 26 at step 301 initializes the list of unresolved nodes 12 by the price node 12h and the discount node 12j since the discounted-price node 12i depends on these two nodes 12h and 12j. The informational-scope builder 26 at step 302 picks one of the unresolved nodes 12, say the discount node 12j. The informational-scope builder 26 at step 303 builds an accessing variable declaration for this node 12j. This variable declaration consists of the variable name 'discount' and a path expression for accessing the value of the discount attribute of the item variable. FIG. 10 shows an AST of an accessing variable declaration, which is the abstract syntax tree 34 of this variable declaration with AST nodes 36. As the variable 'discount' is not used in the current scope definition, the informational-scope builder 26 at step 304 adds this variable declaration at the end of the scope definition:

definitions:
set 'customer' to a customer from 'the customer';
set 'shopping cart' to a shopping cart;
in the shopping carts of 'customer';
set 'item' to an item in the items of 'shopping cart';
set 'discount' to the discount of 'item';

The owner node 12 of the discount node 12j is the item node 12e. This owner node 12e is already resolved as this node 12e has an enumerating variable declaration in the current scope definition. This has the effect that the variable declaration for the discount node 12j will be evaluated in a particular branch of the evaluation process where the item variable has already been bound to an item object. As a consequence, the path expression for the discount of 'item' will evaluate to the discount of the item that is the value of the item variable. Hence, the selection of this discount value is constrained by the common owner of the discount node 12j and the discounted-price node 12i.

Figure 11A:
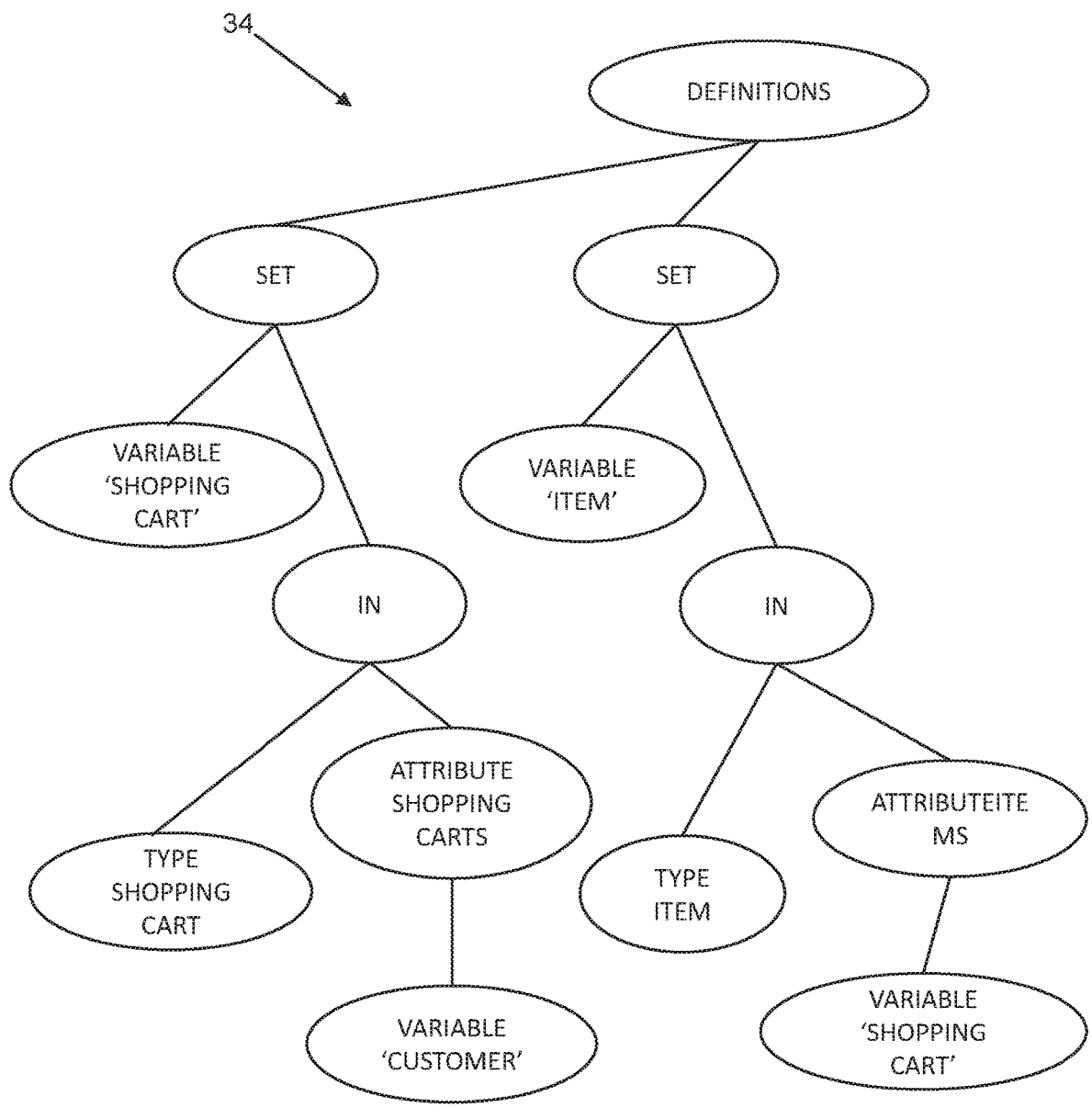
FIGS. 11a and 11b are an AST of a scope definition, in accordance with an exemplary embodiment of the present invention.
Figure 11B:
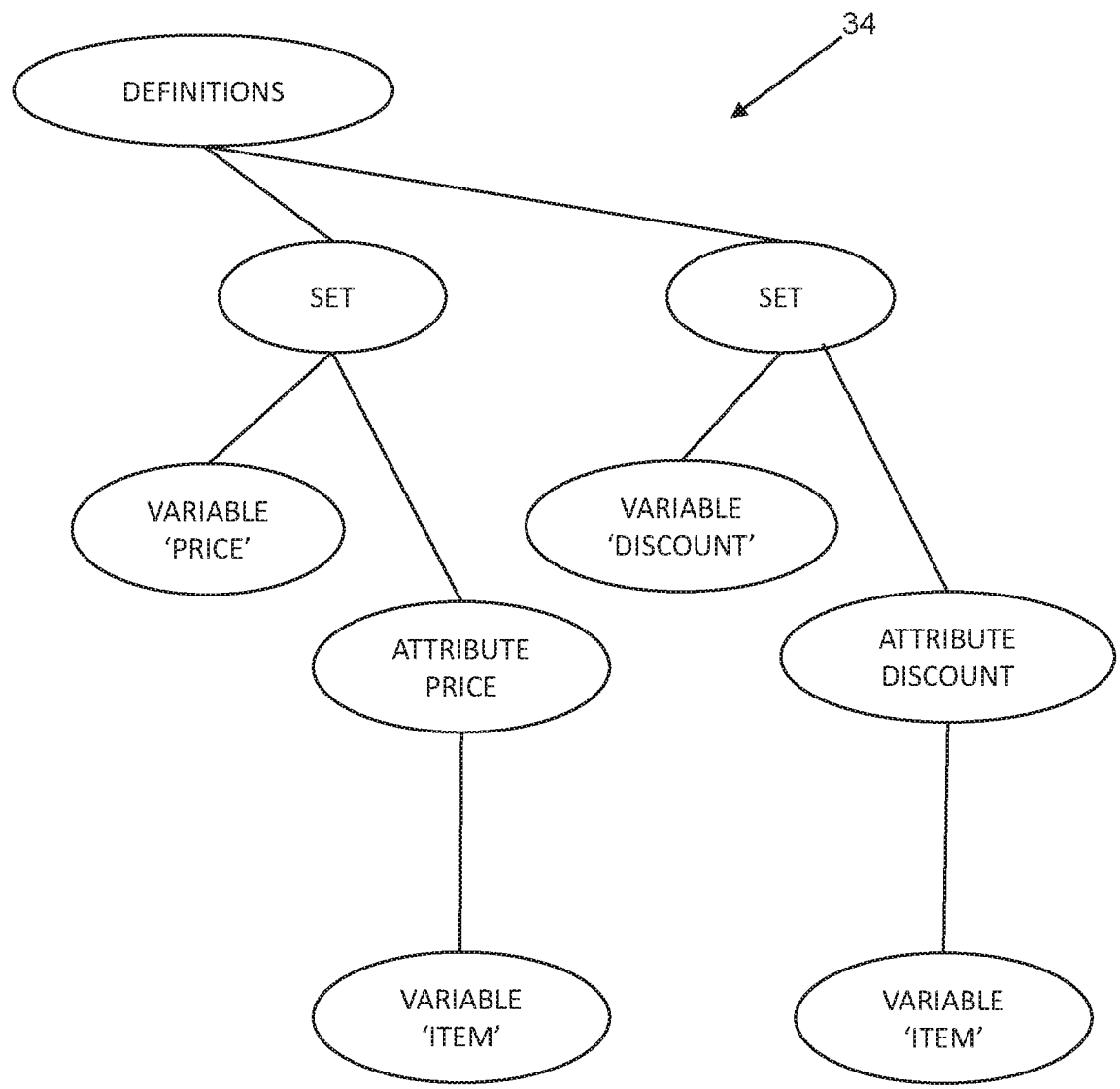

As the owner node 12e is already resolved, the informational-scope builder 26 at step 305 simply removes the discount node 12j from the list of the unresolved nodes 12 and continues the steps above for the remaining unresolved nodes 12. The only remaining unresolved node 12 is the price node 12h. The informational-scope builder 26 at step 303 creates an accessing variable declaration for the price node 12h, which is similar to that of the discount node 12j. As the price variable is not used in the current scope definition, the informational-scope builder 26 at step 304 adds this variable declaration at the end of the scope definition:

definitions:
set 'customer' to a customer from 'the customer';
set 'shopping cart' to a shopping cart;
in the shopping carts of 'customer';
set 'item' to an item in the items of 'shopping cart';
set 'discount' to the discount of 'item';
set 'price' to the price of 'item';

Again, the price node 12h has the item node 12e as owner node 12, which is already resolved. The informational-scope builder 26 at step 305 simply removes the price node 12*h* from the set of unresolved nodes 12, which is now empty after this removal. As there are no further unresolved nodes 12, the informational-scope builder 26 has finished its processing. The scope definition is now complete and the scoped-decision graph builder system 20 attaches this scope definition to the discounted-price node 12*i*. As explained above, some embodiments may create a simplified version of the scope definition which omits the first enumerating variable declaration since its range is a singleton. This simplified scope definition has the following form and its abstract syntax tree is shown in FIGS. 11*a* and 11*b* which shows an AST 34 of a scope definition (half shown in FIG. 11*a* and half shown in FIG. 11*b*).

definitions:
    set 'shopping cart' to a shopping cart;
    in the shopping carts of 'the customer';
    set 'item' to an item in the items of 'shopping cart';
    set 'discount' to the discount of 'item';
    set 'price' to the price of 'item';

In the second iteration of the flowchart of FIG. 6, the scoped-decision graph builder system 20 picks another decision node 12 that has no attached scope definition, for example the discount node 12*j*. The system 20 creates an empty scope definition and invokes the enumerator builder 24 by passing the discount node 12*j*, the scope definition, and the ownership graph 10. The enumerator builder 24 visits all nodes 12 along the path from the owner node (item node 12*e*) of the discount node 12*j* to the root node (customer node 12*a*). This path includes the item node 12*e*, the shopping-cart node 12*c*, and the customer node 12*a*. This is the same path as for the discounted-price node 12*i*. As such, the enumerator builder 24 will construct the same enumerating variable declarations and end up with the same scope definition:

definitions:
    set 'customer' to a customer from 'the customer';
    set 'shopping cart' to a shopping cart;
    in the shopping carts of 'customer';
    set 'item' to an item in the items of 'shopping cart';

The informational-scope builder 26 at step 301 initializes the list of unresolved nodes 12 by the product node 12*g* and the category node 12*b* since the discount node 12*j* depends on these two nodes 12*g* and 12*b*. The informational-scope builder 26 at step 302 picks one of the unresolved nodes 12, for example the product node 12*g*. The informational-scope builder 26 at step 303 builds an accessing variable declaration for this node 12*g*. This variable declaration consists of the variable name 'product' and a path expression for accessing the value of the product attribute of the item variable. As the variable 'product' is not used in the current scope definition, the informational-scope builder 26 at step 304 adds this variable declaration at the end of the scope definition:

definitions:
    set 'customer' to a customer from 'the customer';
    set 'shopping cart' to a shopping cart;
    in the shopping carts of 'customer';
    set 'item' to an item in the items of 'shopping cart';
    set 'product' to the product of 'item';

The informational-scope builder 26 at step 305 then removes the product node 12*g* from the list of unresolved nodes 12. The owner node 12 of the product node 12*g* is the item node 12*e*. As this owner node 12*e* is already resolved, the informational-scope builder 26 does not add this node 12*e* to the list of unresolved nodes 12. As explained before, this has the effect that the decision logic for making a discount decision for an item will only access the product of this item and not the products of other items.

The informational-scope builder 26 then repeats the steps above for the remaining unresolved node 12, which is the category node 12*b*. The informational-scope builder 26 at step 303 builds an accessing variable declaration for this node 12*b*. This variable declaration consists of the variable name 'category' and a path expression for accessing the value of the product attribute of the customer variable as the category node 12*b* has the customer node 12*a* as owner node. As the variable 'category' is not used in the current scope definition, the informational-scope builder 26 at step 304 adds this variable declaration at the end of the scope definition:

definitions:
    set 'customer' to a customer from 'the customer';
    set 'shopping cart' to a shopping cart;
    in the shopping carts of 'customer';
    set 'item' to an item in the items of 'shopping cart';
    set 'product' to the product of 'item';
    set 'category' to the category of 'customer';

The informational-scope builder 26 at step 305 then removes the category node 12*b* from the list of unresolved nodes 12. The owner node 12*a* of the category node 12*b* is already resolved and the informational-scope builder 26 does not add this node 12*a* to the list of unresolved nodes 12. This has the effect that the decision logic for making a discount decision for an item belonging to a shopping cart of the given customer will access the category of this customer. As there are no unresolved nodes 12 left, the informational-scope builder 26 has finished its processing. The scoped-decision graph builder system 20 attaches the resulting scope definition to the discount node 12*j*.

At this stage, the discount node 12*j* and the discounted-price node 12*i* have scope definitions attached to them, but the total-price node 12*f* and expenses node 12*d* are still lacking scope definitions. In the third iteration of the flowchart of FIG. 6, the scoped-decision graph builder system 20 may thus select either of them, for example the total-price node 12*f*. The system 20 invokes the enumerator builder 24 for this total-price node 12*f*. The enumerator builder 24 at step 202 visits all nodes 12 along the path from the owner node (shopping-cart node 12*c*) of the total-price node 12*f* to the root node (customer node 12*a*). This path consists of the shopping-cart node 12*c* and the customer node 12*a*, but not the item node 12*e*. The enumerator builder 24 will construct the enumerating variable declarations in a similar way as before and end up with the following scope definition:

definitions:
    set 'customer' to a customer from 'the customer';
    set 'shopping cart' to a shopping cart;
    in the shopping carts of 'customer';

The informational-scope builder 26 at step 301 initializes the list of unresolved nodes 12 by the discounted-price node 12*i* since the total-price node 12*f* only depends on this node 12*i*. The informational-scope builder 26 at step 302 then picks the discounted-price node 12*i* from the list of unresolved nodes 12 and at step 303 builds an accessing variable declaration for this node 12*i*. As the owner node 12*e* of the discounted-price node 12*i* is the item node 12*e*, this variable declaration consists of the variable name 'discounted prices' and a path expression for accessing the values of the discounted-price attribute of the item variable. The item variable may have multiple values, i.e., multiple item objects, and that each of these item objects has a discounted price. The path expression for the discounted prices of 'items' behaves like a collector expression when being evaluated. This evaluation will construct a list that contains the discounted price of each item that is among the values of the items variable. As the variable 'discounted prices' is not used in the current scope definition, the informational-scope builder 26 at step 304 adds this variable declaration at the end of the scope definition:

definitions:
     set 'customer' to a customer from 'the customer';
     set 'shopping cart' to a shopping cart;
     in the shopping carts of 'customer';
     set 'discounted prices' to the discounted prices of 'items';

The informational-scope builder 26 at step 305 then removes the discounted-price node 12*i* from the list of unresolved nodes 12. The owner node 12*e* of the discounted-price node 12*i* is the item node 12*e*. This time, the item node 12*e* has no variable declaration in the scope definition and is therefore unresolved. The informational-scope builder 26 at step 306 adds this node 12*e* to the list of unresolved nodes 12. The informational-scope builder 26 then repeats the steps above for the remaining unresolved nodes 12, i.e., the newly added item node 12*e*.

The informational-scope builder 26 at step 303 creates an accessing variable declaration for the item node 12*e* which consists of the variable name 'items' and a path expression for accessing the values of the item attribute of the shopping-cart variable. The shopping-cart variable has an enumerating variable declaration and is therefore single-valued. However, the item attribute may have multiple values for a single shopping-cart. The evaluation of the path expression the items of 'shopping cart' will thus result in a list of all items of the shopping-cart object that is the value of the shopping-cart variable in the respective evaluation branch. The variable items' is already used in the current scope definition, namely in the declaration of the discounted-price variable. The informational-scope builder 26 at step 304 therefore inserts the declaration of the item variable just before the declaration of the discounted-price variable:

definitions:
     set 'customer' to a customer from 'the customer';
     set 'shopping cart' to a shopping cart;
     in the shopping carts of 'customer';
     set 'items' to the items of 'shopping cart';
     set 'discounted prices' to the discounted prices of 'items';

The informational-scope builder 26 at step 305 then removes the item node 12*e* from the list of unresolved nodes 12. The owner node 12*c* of the item node 12*e* is the shopping-cart node 12*c*, which is already resolved. Hence, the informational-scope builder 26 does not add this node 12*c* to the list of unresolved nodes 12. This has the effect that the decision logic for making a total-price decision for a shopping cart of the given customer will only access items of this shopping cart and, consequently, only the discounted prices of these items and not the discounted prices of other items. As there are no further unresolved nodes 12, the informational-scope builder 26 has finished its processing. The scoped-decision graph builder system 20 attaches the resulting scope definition to the total-price node 12*f*.

In the fourth iteration of the flowchart of FIG. 6, the scoped-decision graph builder system 20 picks the remaining decision node 12 without an attached scope definition, which is the expenses node 12*d*. The system 20 invokes the enumerator builder 24 for the expenses node 12*d*. As the owner of the expenses node 12*d* is a root node (the customer node 12*a*), the enumerator builder 24 will add a single enumerating variable declaration to the scope definition:

definitions:
     set 'customer' to a customer from 'the customer';

The informational-scope builder 26 at step 301 initializes the list of unresolved nodes 12 by the total-price node 12*f* since the expenses node 12*d* only depends on this node 12*f*. The informational-scope builder 26 then at step 302 picks the total-price node 12*f* from the list of unresolved nodes 12 and at step 303 builds an accessing variable declaration for the total-price node 12*f*. As the owner node 12*c* of the total-price node 12*f* is the shopping-cart node 12*c*, this variable declaration consists of the variable name 'total prices' and a path expression for accessing the values of the total-price attribute of the shopping-cart variable. The shopping-cart variable may have multiple values, i.e., multiple shopping-cart objects, each of which has a total price. The path expression for the total prices of 'shopping carts' behaves like a collector expression when being evaluated. This evaluation will construct a list that contains the total price of each shopping-cart object that is among the values of the shopping-cart variable. As the variable 'total prices' is not used in the current scope definition, the informational-scope builder 26 at step 304 adds its declaration at the end of the scope definition:

definitions:
     set 'customer' to a customer from 'the customer';
     set 'total prices' to the total prices of 'shopping carts';

The informational-scope builder 26 at step 305 then removes the total-price node 12*f* from the list of unresolved nodes 12. The owner node 12*c* of the total-price node 12*f* is the shopping-cart node 12*c*, which has no variable declaration in the scope definition. It is thus unresolved and the informational-scope builder 26 at step 306 therefore adds this node 12*c* to the list of unresolved nodes 12. The informational-scope builder 26 then repeats the steps above for this shopping-cart node 12*c*.

The informational-scope builder 26 at step 303 creates an accessing variable declaration for the shopping-cart node 12*c* which consists of the variable name 'shopping carts' and a path expression for accessing the values of the shopping-cart attribute of the customer variable as the owner node 12*a* of the shopping-cart node 12*c* is the customer node 12*a*. The variable 'shopping carts' is already used in the current scope definition, namely in the declaration of the total-price variable. The informational-scope builder 26 at step 304 therefore inserts the declaration of the shopping-cart variable just before the declaration of the total-price variable:

definitions:
     set 'customer' to a customer from 'the customer';
     set 'shopping carts' to the shopping carts of 'customer';
     set 'total prices' to the total prices of 'shopping carts';

The informational-scope builder 26 at step 305 then removes the shopping-cart node 12*c* from the list of unresolved nodes 12. The owner node 12*a* of the shopping-cart node 12*c* is the customer node 12*a*, which is already resolved. Hence, the informational-scope builder 26 does not add this node 12*a* to the list of unresolved nodes 12. This has the effect that the decision logic for making an expense decision for the given customer object will access the shopping carts of this customer object and, consequently, the total prices of these shopping carts. As there are no further unresolved nodes 12, the informational-scope builder 26 has finished its processing. The scoped-decision graph builder system 20 attaches the resulting scope definition to the expenses node 12*d*. Each decision node 12 in the scoped-decision graph 22 now has a scope definition, meaning that this graph 22 has been fully constructed.

Figure 12:
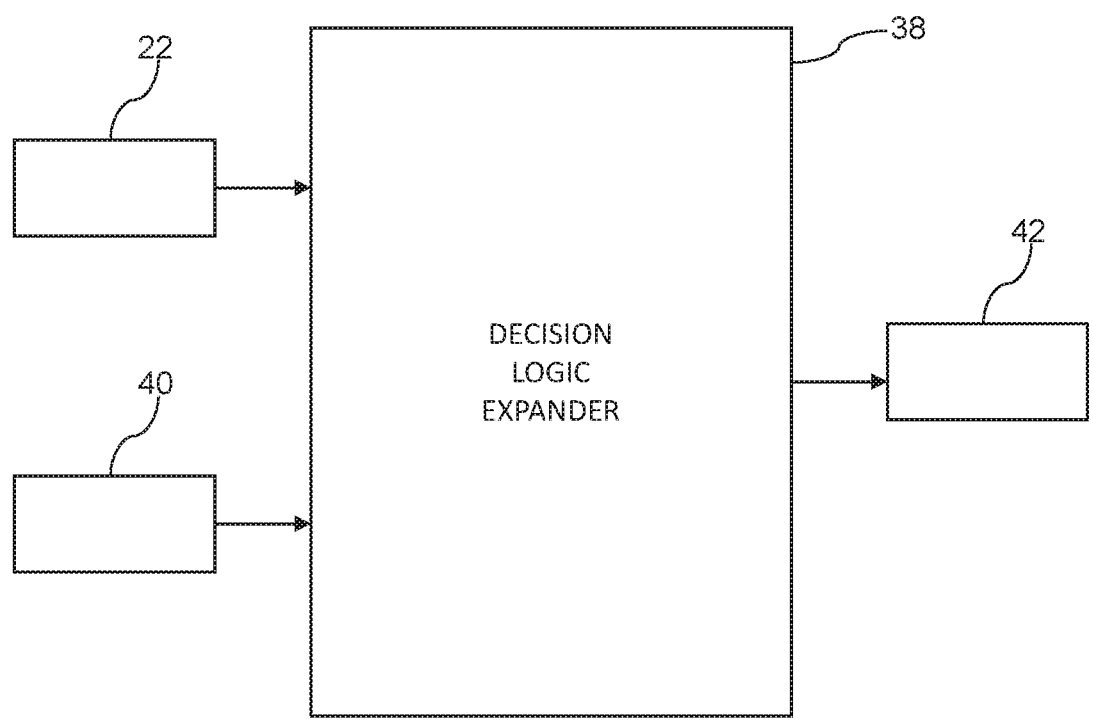
FIG. 12 is a schematic diagram of a decision logic expander, in accordance with an exemplary embodiment of the present invention.

The scoped-decision graph 22 thus provides clean scope definitions for each decision node 12 of the original ownership graph 10. The decision logic for these decision nodes 12 can then be formulated over variables, which significantly simplifies the creation of the decision logics. The decision logics can be created independently of the scope definition. Once they have been created, as shown in FIG. 12, a decision logic expander 38 is provided with the scoped-decision graph 22 and a variable-based decision logic 40 for each node 12. The expander 38 then expands these decision logics 40 into executable decision logics 42 (which can be considered as rules) by adding the corresponding scope definitions from the graph 22.

For example, the discounted-price node has the following decision logic, which is formulated over the variables "price", "discount", and "discounted price":

'discounted price'=('price'*(100−'discount'))/100;

The decision logic expander 38 combines the scope definition of the discounted-price node 12i with this decision logic 40 and adds an action that stores the result in the corresponding attribute of the owner object. This results in the following rule 42:
definitions:
set 'customer' to a customer from 'the customer';
set 'shopping cart' to a shopping cart;
in the shopping carts of 'customer';
set 'item' to an item in the items of 'shopping cart';
set 'discount' to the discount of 'item';
set 'price' to the price of 'item';
then,
'discounted price'=('price'*(100−'discount'))/100;
set the discounted price of 'item' to discounted price;

This rule 42 can be executed by a suitable rule engine. The decision logic of the discount node 12j is the decision table 28 shown in FIG. 5. This decision table 28 has two condition columns 30, namely one for the different values of the variable "product" and the other one for the different values of the variable "category". Furthermore, the table 28 has a single action column 32 which determines the value of the variable 'discount'. The decision logic expander 38 adds the scope definition of the discount node 12j as a precondition to this decision table 28 and adds a final action that stores the discount determined by the decision table 28 in the corresponding attribute of the owner object. Hence, the resulting decision table 28 has the following precondition:
definitions:
set 'customer' to a customer from 'the customer';
set 'shopping cart' to a shopping cart;
in the shopping carts of 'customer';
set 'item' to an item in the items of 'shopping cart';
set 'product' to the product of 'item';
set 'category' to the category of 'customer';
and a final action to retrieve the result:
set the discount of 'item' to 'discount';

Again, such an augmented decision table 28 is executable in a suitable rule language. Finally, the decision logic expander 38 expands the decision logics of the total-price node 12f and the expenses node 12d. The decision logic of the total-price node 12f is simply the sum of all the values of the multi-valued variable "discounted price":

'total price'=sum('discounted prices');

The decision logic expander 38 adds the scope definition of the total-price node 12f and adds an action for storing resulting sum as value of the total-price attribute of the shopping cart:
definitions:
set 'customer' to a customer from 'the customer';
set 'shopping cart' to a shopping cart;
in the shopping carts of 'customer';
set 'items' to the items of 'shopping cart';
set 'discounted prices' to the discounted prices of 'items';
then,
'total price'=sum('discounted prices');
set the total price of 'shopping cart' to total price;

The decision logic of the expenses node 12d has a similar form and the decision logic expander 38 expands the logic into the following rule 42:
Definitions:
set 'customer' to a customer from 'the customer';
set 'total prices' to;
the total prices of the shopping carts of 'customer';
then,
'expenses'=sum('total prices');
set the expenses of 'shopping cart' to expenses;

The decision logic expander 38 thus has expanded all decision rules into executable rule artifacts.

Figure 13:
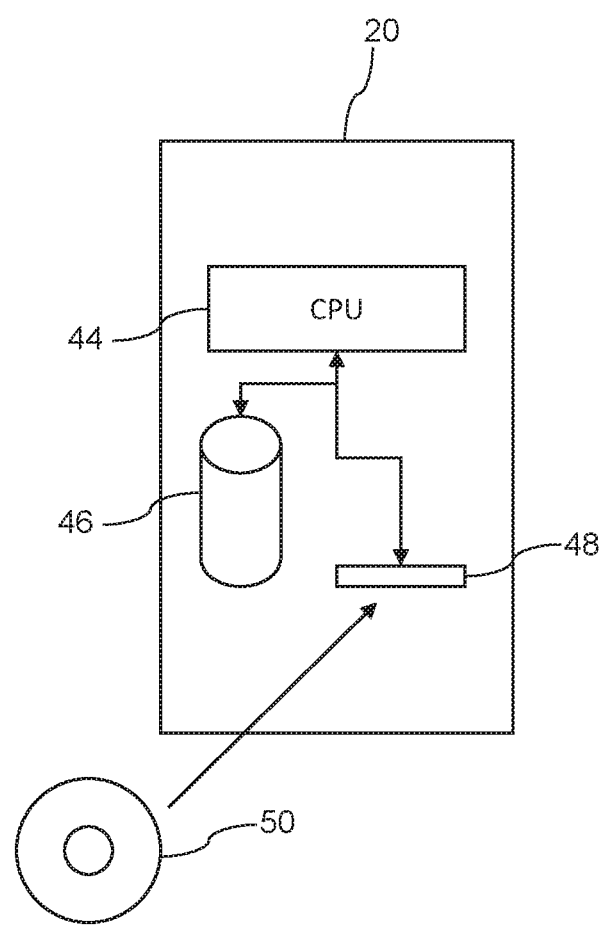
FIG. 13 is more detailed diagram of the system of FIG. 3, in accordance with an exemplary embodiment of the present invention.

The system 20 is shown in more detail in FIG. 13. The system 20 comprises a processor 44, which is controlling the operation of the system 20. The processor 44 of the system 20 is also connected to a local storage device 46 and to a local interface 48. A computer readable storage medium 50 is provided, which is a CD-ROM 50 storing a computer program product that can be used to control the processor 44 to operate the system 20. The processor 44 executes instructions from the computer program product to operate the system 20. The system 20 for each node 12 in the dependency graph 16 with an incoming edge 18 (which is therefore a decision node 12), creates a scope definition and populates the created scope definition with the respective created enumerating variable declarations and the respective created accessing variable declarations for that specific node 12. The system 20 creates a scoped-decision graph 22 comprising the nodes 12 of the dependency graph 16 and the respective scope definitions for each node 12 in the dependency graph 16 with an incoming edge (the decision nodes 12).

The system 20, as described above, can be arranged to receive a plurality of decision logics 40, each decision logic 40 for a respective node 12 in the dependency graph 16 with an incoming edge, expanding each scope definition in the scoped-decision graph 22 with the respective decision logic 40 and generating a set of rules 42, each rule 42 comprising a scope definition expanded by the respective decision logic. The system 20 can supply the set of generated rules 42 to a rules engine, receive a set of data and operate the generated rules 42 across the received set of data.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
receiving an ownership graph, wherein the ownership graph comprises a first set of nodes and a first set of directional edges, wherein each of the first set of directional edges connects two nodes and indicates ownership of a first node by a second node, each node having at most one owner, the ownership graph being acyclic;
receiving a dependency graph, wherein the dependency graph comprises a second set of nodes and a second set of directional edges, wherein each node of the second set of nodes in the dependency graph corresponds to a node of the first set of nodes in the ownership graph, wherein each of the second set of directional edges connects two nodes and indicates a dependency of the first node on the second node, the dependency graph being acyclic, wherein each node of the second set of nodes in the dependency graph with an incoming edge is a decision node;
for each decision node in the dependency graph, automating computer code to implement a respective decision by:

automatically creating a respective enumerating variable declaration for each node in a path from an owner node of a current node to a root node in the ownership graph, by a processor, wherein the respective enumerating variable declaration comprises a variable name, a variable type, and a path expression specifying a variable range;

automatically creating a respective accessing variable declaration for each owner node in the dependency graph of the current node, by the processor, wherein the respective accessing variable declaration comprises a second variable name, and a second path expression specifying one or more values for a variable;

automatically generating a cumulative business decision for the root node, by the processor, based on the created enumerating variable declarations and the created accessing variable declarations for each of the automated decisions; and automatically updating items in a digital shopping cart associated with at least one node in the path from the owner node of the current node to the root node in the ownership graph by the processor based on the automated decisions.

2. The computer-implemented method according to claim 1, further comprising:
creating a scope definition for each node in the dependency graph with an incoming edge; and
populating the created scope definition with the respective enumerating variable declaration and the respective accessing variable declaration for the current node.

3. The computer-implemented method according to claim 2, further comprising:
creating a scoped dependency graph comprising at least one of the first set of nodes and the second set of nodes of the dependency graph and the scope definition for each node in the dependency graph with an incoming edge.

4. The computer-implemented method according to claim 3, further comprising:
receiving a plurality of decision logics, each decision logic for a respective node in the dependency graph with an incoming edge;
expanding each scope definition in the scoped dependency graph with a respective decision logic; and
generating a set of rules, each rule comprising a scope definition expanded by the respective decision logic.

5. The computer-implemented method according to claim 4, further comprising:
supplying the generated set of rules to a rules engine;
receiving a set of data; and
operating the generated set of rules across the received set of data.

6. A computer system, comprising:
one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
receiving an ownership graph comprising a first set of nodes and a first set of directional edges, wherein each of the first set of directional edges connects two nodes and indicates ownership of a first node by a second node, each node having at most one owner, the ownership graph being acyclic;

receiving a dependency graph comprising a second set of nodes and a second set of directional edges, wherein each node of the second set of nodes in the dependency graph corresponds to a node in the first set of nodes in the ownership graph, wherein each of the second set of directional edges connects two nodes and indicates a dependency of the first node on the second node, the dependency graph being acyclic, wherein each node of the second set of nodes in the dependency graph with an incoming edge is a decision node;

for each decision node in the dependency graph, automating computer code to implement a respective decision by: an enumerator builder arranged to automatically create a respective enumerating variable declaration for each node in a path from an owner node of a current node to a root node in the ownership graph, by the one or more processors, wherein the respective enumerating variable declaration comprises a variable name, a variable type, and a path expression specifying a variable range;

an informational-scope builder arranged to automatically create a respective accessing variable declaration for each owner node in the dependency graph of the current node, by the one or more processors, wherein the respective accessing variable declaration comprises a second variable name, and a second path expression specifying one or more values for a variable;

automatically generating a cumulative business decision for the root node, by the one or more processors, based on the created enumerating variable declarations and the created accessing variable declarations; and automatically updating items in a digital shopping cart associated with at least one node in the path from the owner node of the current node to the root node in the ownership graph by the one or more processors based on the automated decisions.

7. The system according to claim 6, further comprising:
creating a scope definition for each node in the dependency graph with an incoming edge; and
populating the created scope definition with the respective enumerating variable declaration and the respective accessing variable declaration for the current node.

8. The system according to claim 7, further comprising:
creating a scoped dependency graph comprising at least one of the first set of nodes and the second set of nodes of the dependency graph and the scope definition for each node in the dependency graph with an incoming edge.

9. The system according to claim 8, further comprising:
receiving a plurality of decision logics, each decision logic for a respective node in the dependency graph with an incoming edge;
expanding each scope definition in the scoped dependency graph with the respective decision logic; and
generating a set of rules, each rule comprising a scope definition expanded by the respective decision logic.

10. The system according to claim 9, further comprising:
supplying the generated set of rules to a rules engine;
receiving a set of data; and
operating the generated set of rules across the received set of data.

11. A computer program product for controlling a system comprising a processor, the computer program product comprising a computer readable storage medium having program instructions embodied therewith, the program instructions executable by the processor to cause the processor to:

receive an ownership graph, wherein the ownership graph comprises a first set of nodes and a first set of directional edges, wherein each of the first set of directional edges connects two nodes and indicates ownership of a first node by a second node, each node having at most one owner, the ownership graph being acyclic;

receive a dependency graph, wherein the dependency graph comprises a second set of nodes and a second set of directional edges, wherein each node of the second set of nodes in the dependency graph corresponds to a node of the first set of nodes in the ownership graph, wherein each of the second set of directional edges connects two nodes and indicates a dependency of the first node on the second node, the dependency graph being acyclic, wherein each node of the second set of nodes in the dependency graph with an incoming edge is a decision node;

for each decision node in the dependency graph, automating computer code to implement a respective decision by:

automatically creating a respective enumerating variable declaration for each node in a path from an owner node of a current node to a root node in the ownership graph, wherein the respective enumerating variable declaration comprises a variable name, a variable type, and a path expression specifying a variable range;

automatically creating a respective accessing variable declaration for each owner node in the dependency graph of the current node, wherein the respective accessing variable declaration comprises a second variable name and a second path expression specifying one or more values for a variable;

automatically generating a cumulative business decision for the root node, by the processor, based on the created enumerating variable declarations and the created accessing variable declarations for each automated decisions; and automatically updating items in a digital shopping cart associated with at least one node in the path from the owner node of the current node to the root node in the ownership graph by the processor based on the automated decisions.

12. The computer program product according to claim 11, further comprising:

creating a scope definition for each node in the dependency graph with an incoming edge; and populating the created scope definition with the respective enumerating variable declaration and the respective accessing variable declaration for the current node.

13. The computer program product according to claim 12, further comprising:

creating a scoped dependency graph comprising at least one of the first set of nodes and the second set of nodes of the dependency graph and the scope definition for each node in the dependency graph with an incoming edge.

14. The computer program product according to claim 13, further comprising:

receiving a plurality of decision logics, each decision logic for a respective node in the dependency graph with an incoming edge;

expanding each scope definition in the scoped dependency graph with a respective decision logic; and generating a set of rules, each rule comprising a scope definition expanded by the respective decision logic.

15. The computer program product according to claim 14, further comprising:

supplying the generated set of rules to a rules engine;
receiving a set of data; and
operating the generated set of rules across the received set of data.

* * * * *